United States Patent
Cheng et al.

(10) Patent No.: US 12,299,687 B2
(45) Date of Patent: May 13, 2025

(54) ABNORMAL BEHAVIOR DETECTION METHOD AND APPARATUS, ELECTRONIC DEVICE, AND COMPUTER-READABLE STORAGE MEDIUM

(71) Applicant: Tencent Technology (Shenzhen) Company Limited, Shenzhen (CN)

(72) Inventors: Zhehao Cheng, Shenzhen (CN); Jingran Dong, Shenzhen (CN); Shouzhi Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 310 days.

(21) Appl. No.: 17/898,324

(22) Filed: Aug. 29, 2022

(65) Prior Publication Data

US 2023/0004979 A1    Jan. 5, 2023

Related U.S. Application Data

(63) Continuation of application No. PCT/CN2021/104999, filed on Jul. 7, 2021.

(30) Foreign Application Priority Data

Aug. 20, 2020  (CN) .......................... 202010840924.8

(51) Int. Cl.
  *G06F 16/00*    (2019.01)
  *G06Q 20/38*    (2012.01)
  (Continued)

(52) U.S. Cl.
  CPC ....... *G06Q 20/4016* (2013.01); *G06Q 20/382* (2013.01); *H04L 67/535* (2022.05)

(58) Field of Classification Search
  CPC ........ G06N 20/00; G06N 7/01; G06Q 20/382; G06Q 20/4016; H04L 67/535
  See application file for complete search history.

(56) References Cited

U.S. PATENT DOCUMENTS

| 7,165,037 B2 | 1/2007 | Lazarus et al. |
| 11,599,746 B2 * | 3/2023 | Yang .................. G06F 18/211 |

(Continued)

FOREIGN PATENT DOCUMENTS

| CN | 103559420 A | 2/2014 |
| CN | 105843947 A | 8/2016 |

(Continued)

OTHER PUBLICATIONS

Tencent Technology, ISR, PCT/CN2021/104999, Oct. 13, 2021, 2 pgs.

(Continued)

*Primary Examiner* — Yicun Wu
(74) *Attorney, Agent, or Firm* — Morgan, Lewis & Bockius LLP

(57) ABSTRACT

This application provides an abnormal online operational behavior detection method performed by an electronic device. The method includes: obtaining a first target sub-model corresponding to a first target object from a first preset object model; determining an abnormal data volume from the first target sub-model based on a preset model parameter and a first detection result by comparing a target data volume and the abnormal data volume; obtaining a second target sub-model corresponding to a second target object and having a highest similarity with the first target sub-model from a second preset object model; obtaining a target maximum data volume corresponding to the second target sub-model, and determining a second detection result by comparing the target data volume and the target maximum data volume; and determining a target detection result of the online operation behavior information in accordance with the first detection result and the second detection result.

19 Claims, 7 Drawing Sheets

(51) Int. Cl.
*G06Q 20/40* (2012.01)
*H04L 67/50* (2022.01)

(56) References Cited

U.S. PATENT DOCUMENTS

| | | |
|---|---|---|
| 2009/0210373 A1 | 8/2009 | Yu et al. |
| 2015/0046216 A1 | 2/2015 | Adjaoute |
| 2019/0130403 A1 | 5/2019 | Merz et al. |
| 2020/0134504 A1 | 4/2020 | Li et al. |
| 2020/0285997 A1* | 9/2020 | Bhattacharyya ......... G06N 7/00 |

FOREIGN PATENT DOCUMENTS

| | | |
|---|---|---|
| GB | 2574779 A | 12/2019 |
| JP | 2019082820 A | 5/2019 |

OTHER PUBLICATIONS

Tencent Technology, WO, PCT/CN2021/104999, Oct. 13, 2021, 4 pgs.
Tencent Technology, IPRP, PCT/CN2021/104999, Feb. 16, 2023, 5 pgs.
Tencent Technology, Extended European Search Report and Supplementary Search Report, EP21857394.7, Sep. 27, 2023, 9 pgs.
Tencent Technology (Shenzhen) Company Limited, Japanese Office Action, JP 2022554811, Oct. 3, 2023, 5 pgs.

* cited by examiner

ABNORMAL BEHAVIOR DETECTION METHOD AND APPARATUS, ELECTRONIC DEVICE, AND COMPUTER-READABLE STORAGE MEDIUM

CROSS-REFERENCE TO RELATED APPLICATIONS

This application is a continuation application of PCT Patent Application No. PCT/CN2021/104999, entitled "ABNORMAL BEHAVIOR DETECTION METHOD AND APPARATUS, AND ELECTRONIC DEVICE AND COMPUTER-READABLE STORAGE MEDIUM" filed on Jul. 7, 2021, which claims priority to Chinese Patent Application No. 202010840924.8, filed with the State Intellectual Property Office of the People's Republic of China on Aug. 20, 2020, and entitled "ABNORMAL BEHAVIOR DETECTION METHOD, DEVICE AND EQUIPMENT AND COMPUTER READABLE STORAGE MEDIUM", all of which are incorporated herein by reference in their entirety.

FIELD OF THE TECHNOLOGY

This application relates to information processing technologies in the field of computer application, and in particular, to an abnormal online operational behavior detection method and apparatus, an electronic device, and a computer-readable storage medium.

BACKGROUND OF THE APPLICATION

With the rapid development of the computer application technologies, an application with various network functions is more widely applied. However, during application of the network functions, malicious processing such as false brushing or stolen account payment is often performed in an abnormal manner. In view of this, to improve the network security, abnormal online operational behavior detection has become increasingly important.

Generally, abnormal online operational behavior detection is usually performed in an unsupervised manner. For example, historical behavior information is clustered to obtain a plurality of clusters, and after online operation behavior information is obtained, the abnormality of the online operation behavior information is determined by judging an ownership relationship between the online operation behavior information and the plurality of clusters. However, during the abnormal online operational behavior detection, since a feature dimension of the online operation behavior information is low, when clustering processing is performed based on the low-dimensional feature to determine a detection result, an error is probably existed in the detection result, resulting in a relatively low accuracy of the abnormal online operational behavior detection.

SUMMARY

Embodiments of this application provide an abnormal online operational behavior detection method and apparatus, an electronic device, and a computer-readable storage medium, to improve the accuracy of abnormal online operational behavior detection.

Technical solutions in the embodiments of this application are implemented as follows:

an embodiment of this application provides an abnormal online operational behavior detection method, performed by an electronic device, the method including:

acquiring online operation behavior information, the online operation behavior information including a first target object, a second target object, and a target data volume;

obtaining a first target sub-model corresponding to the first target object from a first preset object model;

determining an abnormal data volume from the first target sub-model based on a preset model parameter, and determining a first detection result corresponding to the online operation behavior information based on a comparison result between the target data volume and the abnormal data volume;

obtaining a second target sub-model corresponding to the second target object and having a highest similarity with the first target sub-model from a second preset object model;

obtaining a target maximum data volume corresponding to the second target sub-model, and determining a second detection result corresponding to the online operation behavior information based on a comparison result between the target data volume and the target maximum data volume; and determining a target detection result of the online operation behavior information in accordance with the first detection result and the second detection result.

An embodiment of this application provides an abnormal online operational behavior detection apparatus, including:

an information obtaining module, configured to acquire online operation behavior information, the online operation behavior information including a first target object, a second target object, and a target data volume;

a first detection module, configured to obtain a first target sub-model corresponding to the first target object from a first preset object model, the first detection module being further configured to determine an abnormal data volume from the first target sub-model based on a preset model parameter, and determine a first detection result corresponding to the online operation behavior information based on a comparison result between the target data volume and the abnormal data volume;

a second detection module, configured to obtain a second target sub-model corresponding to the second target object and having a highest similarity with the first target sub-model from a second preset object model, the second detection module being further configured to obtain a target maximum data volume corresponding to the second target sub-model, and determine a second detection result corresponding to the online operation behavior information based on a comparison result between the target data volume and the target maximum data volume; and a result determination module, configured to determine a target detection result of the online operation behavior information in accordance with the first detection result and the second detection result.

An embodiment of this application provides an electronic device for abnormal online operational behavior detection, including:

a memory, configured to store executable instructions; and a processor, configured to implement, when executing the executable instructions stored in the memory, the abnormal online operational behavior detection method provided in this embodiment of this application.

An embodiment of this application provides a computer-readable storage medium, storing executable instructions, the executable instructions, when executed by a processor, causing the processor to implement the abnormal online operational behavior detection method provided in this embodiment of this application.

The embodiments of this application have at least the following beneficial effects: When the online operation behavior information includes three dimensional features of the first target object, the second target object, and the target data volume, when the target detection result of whether the online operation behavior information is abnormal is determined with reference to results of respectively comparing the target data volume with the abnormal data volume and the target maximum data volume, since the abnormal data volume is an abnormality judgment condition for the first target object determined based on the first preset object model, and the target maximum data volume is an abnormality judgment condition for the second target object determined based on the second preset object model, in a low-dimensional feature, whether the target data volume is within a preset interval is determined from two dimensions of the first target object and the second target object, to further accurately obtain the target detection result of whether the online operation behavior information is abnormal, thereby improving the accuracy of abnormal online operational behavior detection.

DESCRIPTION OF EMBODIMENTS

Figure 1:
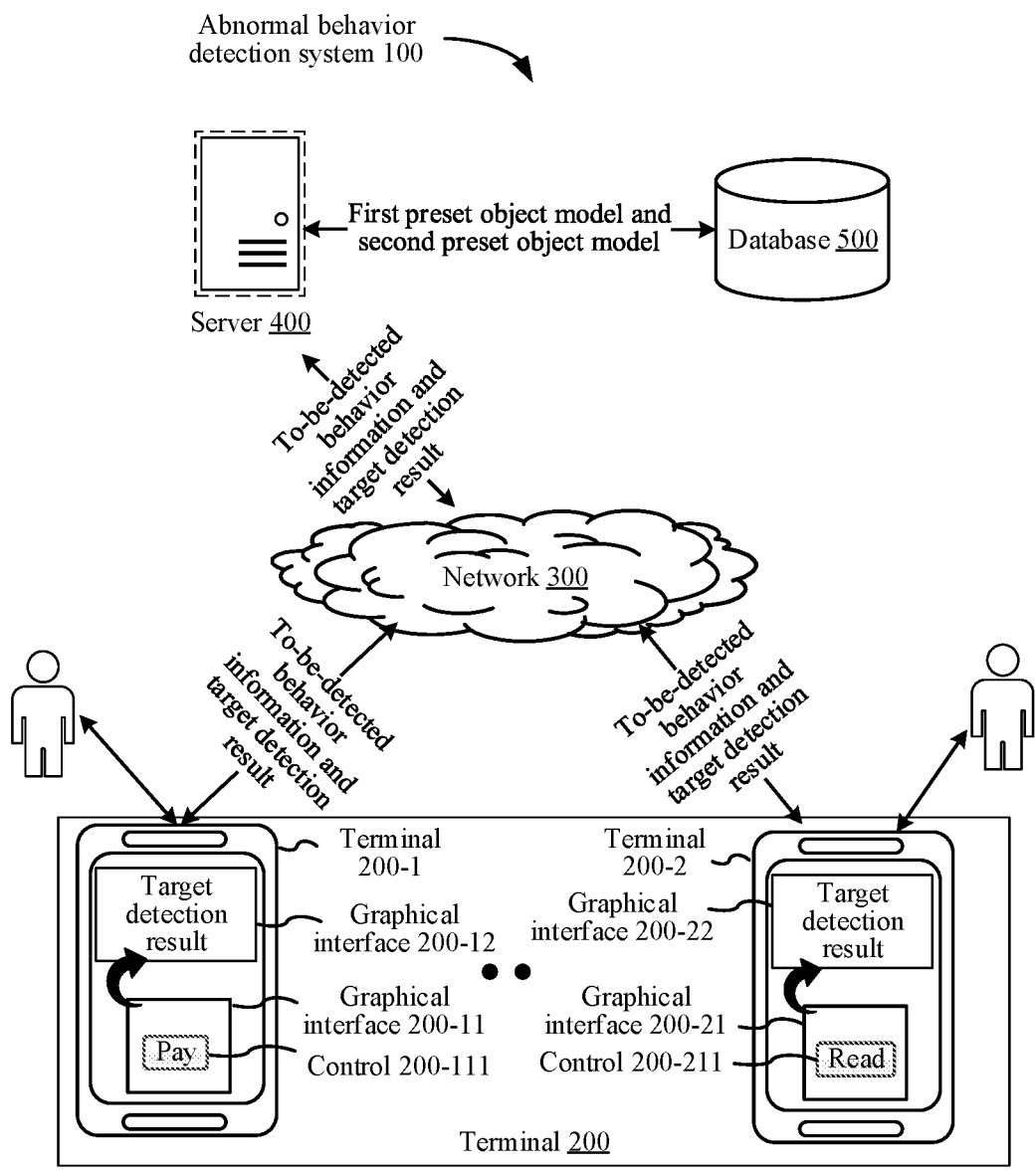
FIG. 1 is an exemplary schematic architecture diagram of an abnormal online operational behavior detection system according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in the embodiments of this application are the same as those usually understood by a person skilled in the art to which this application belongs. Terms used in the embodiments of this application are merely intended to describe objectives of the embodiments of this application, but are not intended to limit this application.

Before the embodiments of this application are further described in detail, a description is made on nouns and terms in the embodiments of this application, and the nouns and terms in the embodiments of this application are applicable to the following explanations.

1) Abnormal behavior detection: It refers to detection of whether data corresponding to a user's operation behavior conforms to a preset operation process or an actual process, for example, detection of stolen account payment and false brushing.

2) Offline environment: It refers to a platform for processing massive f data (for example, billion-level data) based on a data mining tool (for example, "Hadoop" and "spark"). Usually there is a relatively high delay (for example, a delay of one day), causing poor real-time performance.

3) Real-time/online environment: It is used for a platform for efficiently storing and computing to-be-processed data in real time, a delay is usually within milliseconds, the complexity is low, and the real-time performance is relatively high.

Generally, abnormal online operational behavior detection is usually implemented in an unsupervised and supervised manner. When abnormal online operational behavior detection is performed in an unsupervised manner, it indicates that an unsupervised algorithm is applied to the abnormal online operational behavior detection. For example, when behavior information in an application scenario obeys mixture Gaussian distribution, during abnormal online operational behavior detection, whether online operation behavior information is abnormal may be determined by judging whether the online operation behavior information obeys mixture Gaussian distribution. In another example, historical behavior information is clustered to obtain a plurality of clusters, and after online operation behavior information is obtained, the abnormality of the online operation behavior information is determined by judging an ownership relationship between the online operation behavior information and the plurality of clusters. In still another example, behavioral information corresponding to an isolated point in a space is determined as abnormal online operational behavioral information by using an outlier detection algorithm (for example, an isolation forest algorithm). However, when abnormal online operational behavior detection is performed in an unsupervised manner, the feature is low-dimensional when the online operation behavior information includes three dimensional features of a first target object, a second target object, and a target data volume (for example, a user, a merchant, and an amount; a user, a product, and an amount; or a user, an article, and views); and when detection is performed based on the low-dimensional feature in an unsupervised manner to determine a detection result, an error is probably existed in the detection result, resulting in a relatively low accuracy of the abnormal online operational behavior detection. In addition, when a feature of more than three dimensions is obtained for unsupervised detection, a detection duration is relatively long due to a relatively high feature dimension/complexity, resulting in poor real-time performance of the detection.

When abnormal online operational behavior detection is performed in a supervised manner, it indicates that a sample is labeled, a network model is trained by using a sample feature and labeled information, and then whether the online operation behavior information is abnormal is detected by using the network model. However, when abnormal online operational behavior is performed in a supervised manner, the sample needs to be labeled, and it is less feasible to perform labeling when a data volume of the sample is relatively large, for example, reaches a level of hundred million. For example, when whether payment is abnormal is detected, since hundreds of millions of payments are generated every day, it is less feasible to perform manual labeling. In addition, a long labeling duration may result in a relatively long duration for network model training. After the network model is trained, the trained network model may no longer be applicable to the current application scenario when the behavior information in the application scenario changes rapidly and abnormal online operational behavior detection in the application scenario is time-based. As a result, labeling is less feasible and cannot be applied to an application scenario with higher timeliness.

In view of this, embodiments of this application provide an abnormal online operational behavior detection method and apparatus, an electronic device, and a computer-readable storage medium, which can quickly and accurately perform abnormal online operational behavior detection and is applicable to an application scenario with higher timeliness.

The following describes an exemplary application of an electronic device for abnormal online operational behavior detection (hereinafter briefly referred to as an abnormal online operational behavior detection device) provided in the embodiments of this application. The abnormal online operational behavior detection device provided in the embodiments of this application may be implemented as various types of terminals such as a notebook computer, a tablet computer, a desktop computer, a set top box, or a mobile device (such as a mobile phone, a portable music player, a personal digital assistant, a dedicated messaging device, a portable game device, an in-vehicle device, a smartphone, or a smart watch), or may be implemented as a server. An exemplary application in which the device is implemented as a server is described below.

Referring to FIG. 1, FIG. 1 is an exemplary schematic architecture diagram of an abnormal online operational behavior detection system according to an embodiment of this application. As shown in FIG. 1, to support an abnormal online operational behavior detection application, in an abnormal online operational behavior detection system 100, terminals 200 (where a terminal 200-1 and a terminal 200-2 are shown as an example) are connected to a server 400 (the abnormal online operational behavior detection device) through a network 300. The network 300 may be a wide area network, a local area network, or a combination of thereof. In addition, the abnormal online operational behavior detection system 100 further includes a database 500.

The database 500 is configured to store a first preset object model and a second preset object model, and provide the first preset object model and the second preset object model to the server 400, to implement abnormal online operational behavior detection.

The terminal 200-1 is configured to receive a payment operation by a user through a control 200-111 (a payment button is exemplarily shown) on a graphical interface 200-11, send, in response to the payment operation, online operation behavior information including a merchant (a first target object), a user (a second target object), and an amount (a target data volume) to the server 400 through the network 300, receive, through the network 300, a target detection result sent by the server 400, and display the target detection result on a graphical interface 200-12.

The terminal 200-2 is configured to receive a reading operation by the user through a control 200-211 (a reading button is exemplarily shown) on a graphical interface 200-21, send, in response to the reading operation, online operation behavior information including an article (a first target object), a user (a second target object), and views (a target data volume) to the server 400 through the network 300, receive, through the network 300, a target detection result sent by the server 400, and display the target detection result on a graphical interface 200-22.

The server 400 is configured to: acquire online operation behavior information from the terminals 200 through the network 300, the online operation behavior information including a first target object, a second target object, and a target data volume; obtain a first target sub-model corresponding to the first target object from a first preset object model provide by the database 500; determine an abnormal data volume from the first target sub-model based on a preset model parameter, and determine a first detection result corresponding to the online operation behavior information by comparing the target data volume with the abnormal data volume; obtain a second target sub-model corresponding to the second target object and having a highest similarity with the first target sub-model from a second preset object model provided by the database 500; obtain a target maximum data volume corresponding to the second target sub-model, and determine a second detection result corresponding to the online operation behavior information by comparing the target data volume with the target maximum data volume; determine a target detection result of the online operation behavior information in accordance with the first detection result and the second detection result; and send the target detection result to the terminals 200 through the network 300.

In some embodiments, the server 400 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal and the server may be directly or indirectly connected in a wired or wireless communication manner. This is not limited in the embodiments of the present disclosure.

Figure 2:
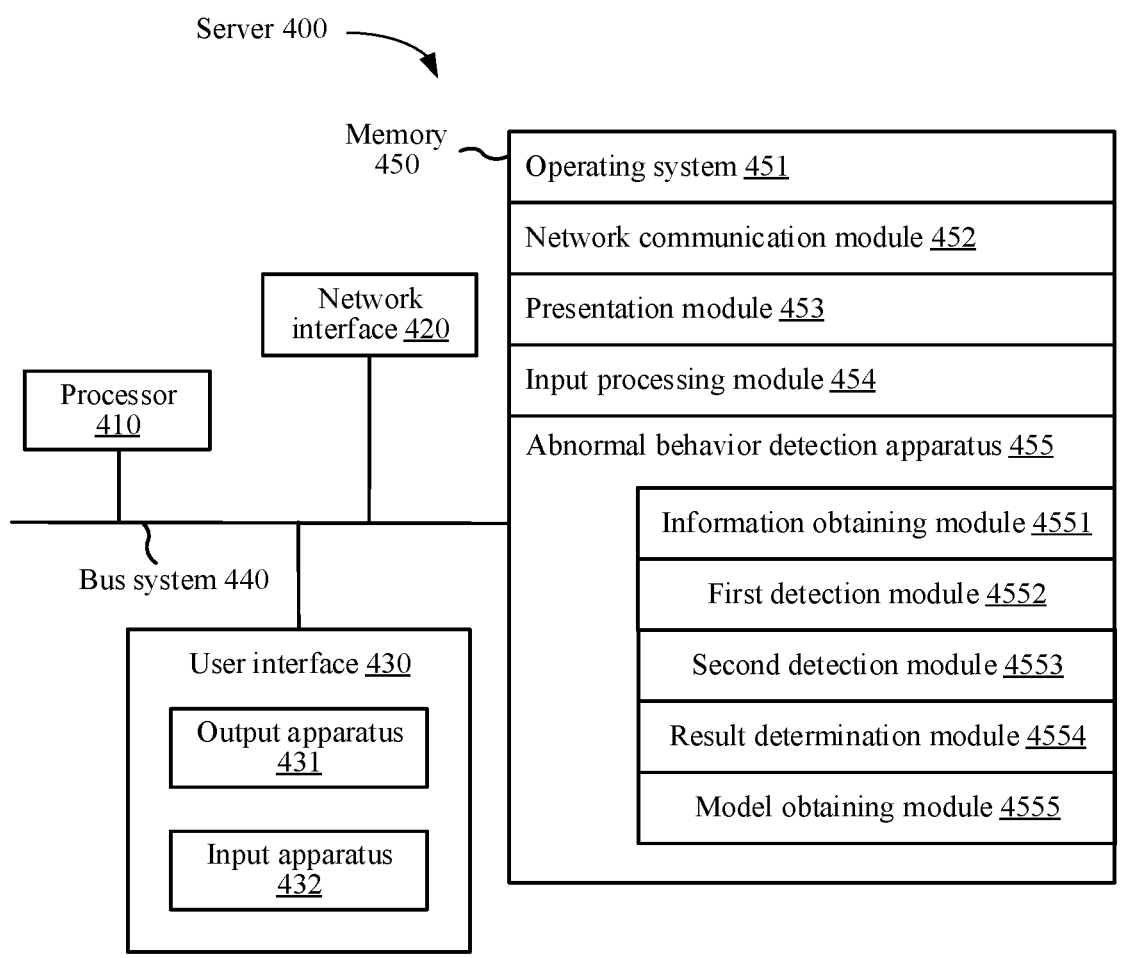
FIG. 2 is a schematic diagram of a composition structure of a server in FIG. 1 according to an embodiment of this application.

Referring to FIG. 2, FIG. 2 is a schematic diagram of a composition structure of a server in FIG. 1 according to an embodiment of this application. The server 400 shown in FIG. 2 includes at least one processor 410, a memory 450, at least one network interface 420, and a user interface 430. Components in the server 400 are coupled together by using a bus system 440. It may be understood that the bus system 440 is configured to implement connection and communication between the components. In addition to a data bus, the bus system 440 further includes a power bus, a control bus, and a status signal bus. However, for ease of clear description, all types of buses are marked as the bus system 440 in FIG. 2.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 430 includes one or more output apparatuses 431 that enable presentation of media content, including one or more speakers and/or one or more visualization displays. The user interface 430 further includes one or more input apparatuses 432, including user interface components helping a user input, such as a keyboard, a mouse, a microphone, a touch display screen, a camera, and other input buttons and controls.

The memory 450 may be a removable memory, a non-removable memory, or a combination thereof. Exemplary hardware devices include a solid-state memory, a hard disk drive, an optical disc driver, or the like. The memory 450 includes one or more storage devices physically away from the processor 410.

The memory 450 includes a volatile memory or a non-volatile memory, or may include both a volatile memory and a non-volatile memory. The non-volatile memory may be a read-only memory (ROM), and the volatile memory may be a random access memory (RAM). The memory 450 described in this embodiment of this application includes any suitable type of memory.

In some embodiments, the memory 450 may store data to support various operations. Examples of the data include programs, modules, and data structures, or a subset or a superset thereof. The descriptions are made below by using examples.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Exemplary network interfaces 420 include: Bluetooth, wireless compatible authentication (Wi-Fi), a universal serial bus (USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the abnormal online operational behavior detection apparatus provided in this embodiment of this application may be implemented in a form of software. FIG. 2 shows an abnormal online operational behavior detection apparatus 455 stored in the memory 450, which may be software in a form such as a program and a plug-in, and includes the following software modules: an information obtaining module 4551, a first detection module 4552, a second detection module 4553, a result determination module 4554, and a model obtaining module 4555. Such modules are logical, and therefore may be randomly combined or further divided according to a function to be implemented. A function of each module is described below.

In some other embodiments, the abnormal online operational behavior detection apparatus provided in this embodiment of this application may be implemented by using hardware. For example, the abnormal online operational behavior detection apparatus provided in this embodiment of this application may be a processor in a form of a hardware decoding processor, programmed to perform the abnormal online operational behavior detection method provided in the embodiments of this application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

The abnormal online operational behavior detection method provided in the embodiments of this application is described below with reference to an exemplary application in which the abnormal online operational behavior detection device provided in this embodiment of this application is implemented as a server.

Figure 3:
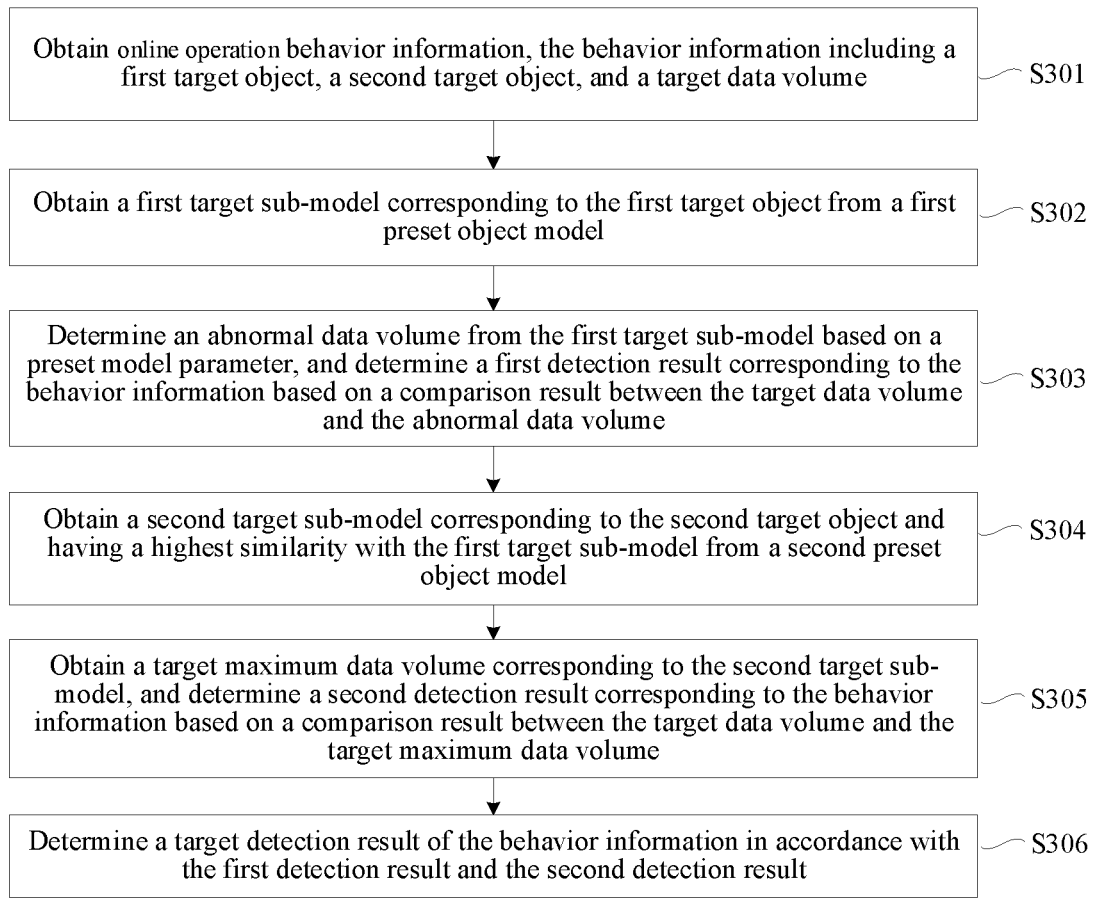
FIG. 3 is an exemplary schematic flowchart of an abnormal online operational behavior detection method according to an embodiment of this application.

Referring to FIG. 3, FIG. 3 is an exemplary schematic flowchart of an abnormal online operational behavior detection method according to an embodiment of this application, and the method is described with reference to steps shown in FIG. 3.

S301: Acquire online operation behavior information, the online operation behavior information including a first target object, a second target object, and a target data volume.

In this embodiment of this application, when the user performs an operation on a functional application in a terminal, for example, performing payment, reading an article, or clicking on an advertisement, the terminal generates operation data in response to the operation performed by the user, and sends the operation data to the server, and then the server receives the online operation behavior information. In this way, the online operation behavior information is obtained.

The online operation behavior information is a detection object, including a first target object, a second target object, and a target data volume. The first target object is an operated object, for example, an advertisement, a merchant, a product, or an article. The second target object is an operation object, for example, a user, or the like. The target data volume is a data volume generated by performing an operation on the first target object by the second target object, for example, an amount, clicks, or views.

S302: Obtain a first target sub-model corresponding to the first target object from a first preset object model.

In this embodiment of this application, the server prestores the first preset object model, or the server can obtain the first preset object model in advance. The first preset object model is a model corresponding to each first object, and the model is data volume distribution information. Since the first target object is a first object, the server can obtain a model corresponding to the first target object from the first preset object model. In this case, the first target sub-model is obtained.

In other words, the first preset object model is a correspondence between first objects and the data volume distribution information. Since the first target object is a first object, on the basis of the correspondence between the first objects and the data volume distribution information, the server matches the first target object with each first object in the correspondence between the first objects and the data volume distribution information, to obtain a first object from the first objects through matching, and determines data volume distribution information corresponding to the matched first object as the first target sub-model.

The first target sub-model is data volume distribution information corresponding to the first target object, for example, a histogram of an amount corresponding to a merchant A, or distribution of views corresponding to an article B.

In addition, in this embodiment of this application, when the model corresponding to the first target object is not obtained from the first preset object model, the server constructs a first target sub-model for the first target object, and adds the first target sub-model corresponding to the first target object to the first preset object model.

S303: Determine an abnormal data volume from the first target sub-model based on a preset model parameter, and determine a first detection result corresponding to the online operation behavior information based on a comparison result between the target data volume and the abnormal data volume.

In this embodiment of this application, the server stores the preset model parameter, or the server can obtain the preset model parameter in advance. The preset model parameter is a preset quantile in the data volume distribution information, and is used for determining a preset range of a data volume corresponding to the first target object. The determined preset interval of the data volume corresponding to the first target object is an abnormality judgment condition corresponding to the first target object. Therefore, the server can determine a target position corresponding to the preset model parameter from the first target sub-model, where a data volume of the target position is the abnormal data volume. Next, after comparing the target data volume with the abnormal data volume, the server can determine whether the target data volume is within the preset interval (ranging from zero to the abnormal data volume) of the data volume corresponding to the first target object according to the comparison result between the target data volume and the abnormal data volume. In this case, the first detection result corresponding to the online operation behavior information is obtained.

The first detection result is a result of whether the online operation behavior information is abnormal determined for the first target object. When the target data volume is greater than the abnormal data volume, it indicates that the target data volume exceeds the preset interval of the data volume corresponding to the first target object, and the server determines the first detection result that the online operation behavior information is abnormal with respect to the first target object. When the target data volume is less than or equal to the abnormal data volume, it indicates that the target data volume is within the preset interval of the data volume corresponding to the first target object, and the server determines the first detection result that the online operation behavior information is normal with respect to the first target object.

Figure 4:
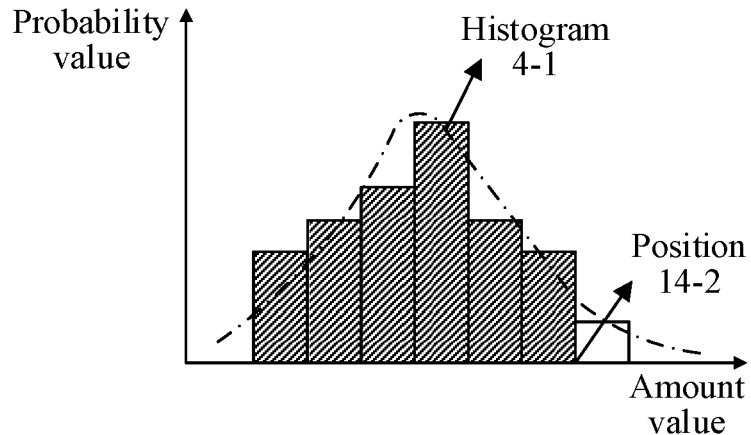
FIG. 4 is an exemplary schematic diagram of determining an abnormal data volume according to an embodiment of this application.

Exemplarily, referring to FIG. 4, FIG. 4 is an exemplary schematic diagram of determining an abnormal data volume according to an embodiment of this application. As shown in FIG. 4, in a histogram 4-1 (the first target sub-model), a transverse axis is an amount value, and a longitudinal axis is a probability value. Probability values of amount segments in the histogram 4-1 are superimposed in ascending order of the amount value when the preset model parameter is the $99^{th}$ quantile, and when a superposition result is greater than 99%, an amount value corresponding to a position 14-2 (which is a target position, a probability of an amount less than an amount value corresponding to the position 14-2 is greater than 99%) is the abnormal data volume.

S304: Obtain a second target sub-model corresponding to the second target object and having a highest similarity with the first target sub-model from a second preset object model.

In this embodiment of this application, the server prestores the second preset object model, or the server can obtain the second preset object model in advance. The second preset object model is a model set formed by each piece of data volume distribution information corresponding to the second object with respect to each first object. Since the second target object is a second object, the server can obtain a model group corresponding to the second target object from the second preset object model, and match a model having a highest similarity with the first target sub-model from the obtained model group corresponding to the second target object, so that the second target sub-model is obtained.

In other words, in the second preset object model, the server matches each second target object with the second objects to obtain matched each piece of data volume distribution information (the model group) corresponding to the second object with respect to the first object, and further obtains data volume distribution information most similar to the obtained first target sub-model from the piece of data volume distribution information, where the data volume distribution information most similar to the first target sub-model is the second target sub-model. Data volume distribution information corresponding to the first object in the first preset object model is different from data volume distribution information corresponding to the first object in the second preset object model, the data volume distribution information corresponding to the first object in the second preset object model is obtained by processing the data volume distribution information corresponding to the first object in the first preset object model, which is data volume distribution information corresponding to the second object with respect to the first object.

The second target sub-model is data volume distribution information corresponding to the second target object with respect to the first target object, for example, an amount histogram of a user C with respect to the merchant A, or distribution of views of a user D with respect to the article B.

S305: Obtain a target maximum data volume corresponding to the second target sub-model, and determine a second detection result corresponding to the online operation behavior information based on a comparison result between the target data volume and the target maximum data volume.

In this embodiment of this application, after the server obtains the second target sub-model, since the second preset object model not only includes a model group corresponding to each second object, but also includes a maximum data volume corresponding to the second object, the server determines the target maximum data volume based on a maximum data volume corresponding to the second target object in the second preset object model. In other words, the target maximum data volume may be the maximum data volume corresponding to the second target object, or may be determined based on the maximum data volume corresponding to the second target object in the second preset object model. This is not specifically limited in this embodiment of this application.

In this case, the server obtains the target maximum data volume, so that a preset interval of a data volume corresponding to the second target object is determined, where the determined preset interval of the data volume corresponding to the second target object is an abnormality judgment condition corresponding to the second target object. Therefore, after comparing the target data volume with the target maximum data volume, the server can determine whether the target data volume is within the preset interval (ranging from zero to the target maximum data volume) of the data volume corresponding to the second target object according to the comparison result between the target data volume and the target maximum data volume. In this case, the second detection result corresponding to the online operation behavior information is obtained.

The second detection result is a result of whether the online operation behavior information is abnormal determined for the second target object. When the target data volume is greater than the target maximum data volume, it indicates that the target data volume exceeds the preset interval of the data volume corresponding to the second target object, and the server determines the second detection result that the online operation behavior information is abnormal with respect to the second target object. When the target data volume is less than or equal to the target maximum data volume, it indicates that the target data volume is within the preset interval of the data volume corresponding to the second target object, and the server determines the second detection result that the online operation behavior information is normal with respect to the second target object.

S306: Determine a target detection result of the online operation behavior information in accordance with the first detection result and the second detection result.

In this embodiment of this application, after obtaining the first detection result and the second detection result, the server determines the target detection result of the online operation behavior information in accordance with the first detection result and the second detection result. The target detection result indicates whether the online operation behavior information is abnormal.

The determining, by the server, a target detection result of the online operation behavior information in accordance with the first detection result and the second detection result includes: when the first detection result is that the online operation behavior information is abnormal with respect to the first target object and the second detection result is that the online operation behavior information is abnormal with respect to the second target object, determining, by the server, the target detection result including that the online operation behavior information is abnormal; when the first detection result is that the online operation behavior information is normal with respect to the first target object and the second detection result is that the online operation behavior information is abnormal with respect to the second target object, determining, by the server, the target detection result including that the online operation behavior information is abnormal, determining the target detection result including that the online operation behavior information is normal, and determining the online operation behavior information as to-be-audited behavior information, to further detect by performing intelligent detection processing in manual manner; when the first detection result is that the online operation behavior information is normal with respect to the first target object and the second detection result is that the online operation behavior information is normal with respect to the second target object, determining, by the server, the target detection result including that the online operation behavior information is normal; and when the first detection result is that the online operation behavior information is abnormal with respect to the first target object and the second detection result is that the online operation behavior information is normal with respect to the second target object, determining, by the server, the target detection result including that the online operation behavior information is normal, determining the target detection result including that the online operation behavior information is abnormal, and determining the online operation behavior information as to-be-audited behavior information, to further detect by performing intelligent detection processing in manual manner.

In this embodiment of this application, after obtaining the target detection result, the server may further determine target processing information according to the target detection result. The target processing information is a processing manner for the online operation behavior information, for example, when the online operation behavior information is the payment operation, when the target detection result is that the online operation behavior information is abnormal, the target processing information is the processing of blocking the payment operation. In another example, when the online operation behavior information is advertisement clicking, when the target detection result is that the online operation behavior information is abnormal, the target processing information is the processing of blocking the advertisement clicking.

It may be understood that, when the online operation behavior information includes three dimensional features of the first target object, the second target object, and the target data volume, when the target detection result of whether the online operation behavior information is abnormal is determined with reference to results of respectively comparing the target data volume with the abnormal data volume and the target maximum data volume, since the abnormal data volume is an abnormality judgment condition for the first target object determined based on the first preset object model, and the target maximum data volume is an abnormality judgment condition for the second target object determined based on the second preset object model, in a low-dimensional feature, whether the target data volume is within a preset interval is determined from two dimensions of the first target object and the second target object, to further accurately obtain the target detection result of whether the online operation behavior information is abnormal, so that the accuracy of abnormal online operational behavior detection is relatively high.

Figure 5:
FIG. 5 is another exemplary schematic flowchart of an abnormal online operational behavior detection method according to an embodiment of this application.

Referring to FIG. 5, FIG. 5 is another optional schematic flowchart of an abnormal online operational behavior detection method according to an embodiment of this application. As shown in FIG. 5, in this embodiment of this application, before S302, the method further includes S307 to S311. In other words, before the obtaining, by the server, a first target sub-model corresponding to the first target object from a first preset object model, the abnormal online operational behavior detection method further includes S307 to S311. The steps are described as follows:

S307: Obtain a behavior information sample.

In this embodiment of this application, the server obtains behavior information in a current cycle, so that the behavior information sample is obtained, for example, payment orders in a last week, or reading records in a last month. The current cycle refers to the most recent preset cycle.

The behavior information sample is a set formed by behavior information corresponding to a first object, a second object, and a data volume in a current cycle, and therefore, each piece of behavior information in the behavior information sample includes the first object, the second object, and the data volume.

S308: Aggregate the behavior information sample according to a first preset object type to obtain a data volume set corresponding to each first object, construct a first sub-model corresponding to the first object according to the data volume set, and determine each constructed first sub-model corresponding to the first object as the first preset object model.

After obtaining the behavior information sample, the server aggregates the behavior information sample according to different preset types, to obtain the first preset object model and the second preset object model. The different preset types include a first preset object type (for example, a merchant type or a product type) and a second preset object type (for example, a user), where the first preset object type is an object type to which the first object belongs, and the second preset object type is an object type to which the second object belongs. Therefore, the data volume set corresponding to the first object is obtained when the server aggregates the behavior information sample according to the first preset object type, to obtain each data volume corresponding to each first object.

The object type corresponding to each first object is the first preset object type. The data volume set is a set formed by a data volume of the first object with respect to the second object.

In this embodiment of this application, after obtaining the data volume set, the server determines data volume distribution information corresponding to each first object according to the data volume set, so that the first sub-model corresponding to the first object is constructed. The first sub-model corresponding to the first object is obtained after the first sub-model corresponding to the first object is constructed, where the first sub-model corresponding to the first object is the first preset object model. The first object refers to any object in the first objects, and the first preset object model refers to a set formed by the first sub-model of the first object. The first target sub-model is a first sub-model.

S309: Aggregate the behavior information sample according to a second preset object type, to obtain a first object set and a maximum data volume corresponding to each second object.

In this embodiment of this application, the first object set corresponding to the second object is obtained when the server aggregates the behavior information sample according to the second preset object type, to obtain the first object corresponding to the second object. Each data volume corresponding to the second object is further obtained when the server aggregates the behavior information sample according to the second preset object type, and a maximum data volume is selected from the data volume corresponding to the second object, so that the maximum data volume corresponding to the second object.

S310: Traverse the first object set, and construct at least one second object sub-model based on the first sub-model corresponding to the traversed first object.

In this embodiment of this application, after obtaining the first object set, the server traverses the first objects in the first object set, and the traversed first objects is matched with the first objects in the first preset object model, where a model corresponding to a matched first object is a first sub-model corresponding to the traversed first object. The server constructs the at least one second object sub-model corresponding to the second object by using the first sub-model corresponding to the traversed first object.

The at least one second object sub-model is a set formed by the data volume of the first object associated with the second object, for example, an amount histogram of a user C with respect to the merchant A, an amount histogram of the user C with respect to a merchant E, and an amount histogram of the user C with respect to a merchant F. The traversed first object is any first object in the first object set.

S311: Combine the at least one second object sub-model and the maximum data volume into a second sub-model corresponding to the second object, and determine each combined second sub-model corresponding to the second object as the second preset object model.

After obtaining the at least one second object sub-model corresponding to the second object, the server combines the at least one second object sub-model and the maximum data volume, where an obtained combination result is the second sub-model corresponding to the second object. The second preset object model of the second sub-model corresponding to the second object is obtained when the second sub-model corresponding to the second object is obtained. The second object refers to any object in the second objects, and the second preset object model refers to a set formed by the second sub-model of the second object.

In this embodiment of this application, the constructing, by the server, a first sub-model corresponding to the first object according to the data volume set described in S308 includes S3081 to S3085. The steps are described as follows:

S3081: Obtain a data volume range corresponding to each data volume in the data volume set.

In this embodiment of this application, the server extracts a minimum data volume and a maximum data volume from each data volume in the data volume set, where a range between the minimum data volume and the maximum data volume is the data volume range.

S3082: Segment the data volume range to obtain a plurality of target segments.

In this embodiment of this application, the server segments the data volume range according to a magnitude or quantity of a preset segment, so that the plurality of target segments are obtained.

S3083: Collect statistics on a target quantity of data volumes of each target segment in the plurality of target segments from the data volume set.

In this embodiment of this application, after obtaining the plurality of target segments and the data volume set, the server determines a target segment to which the data volume in the data volume set belongs, to further collect statistics a quantity of the data volumes of the target segment in the plurality of target segments. The quantity of the data volumes of the target segment obtained by collecting statistics is the target quantity corresponding to the target segment.

S3084: Determine a ratio of the target quantity to a set element quantity corresponding to the data volume set as a probability value corresponding to the target segment.

In this embodiment of this application, the server collects statistics on the quantity of the data volumes in the data volume set, the quantity of the data volumes in the data volume set obtained by collecting statistics is the set element quantity corresponding to the data volume set. In this case, a ratio is calculated by using the target data volume as a numerator and using the set element quantity as a denominator, and an obtained ratio result is the probability value corresponding to the target segment. The plurality of probability values corresponding to the plurality of target segments are obtained after the probability value corresponding to the target segment is obtained, where the plurality of target segments and the plurality of probability values are in a one-to-one correspondence.

S3085: Determine a plurality of determined probability values corresponding to the plurality of target segments as the first sub-model corresponding to the first object.

The first sub-model is the plurality of probability values corresponding to the plurality of target segments associated with the first objects.

In this embodiment of this application, S3081 may be implemented through S30811 and S30812. In other words, the obtaining, by the server, a data volume range corresponding to each data volume in the data volume set includes S30811 and S30812. The steps are described as follows:

S30811: Convert the data volume in the data volume set, to obtain a converted data volume set.

Since distribution corresponding to the data volume in the data volume set is usually logarithmic normal distribution, there is a smooth portion (a long tail portion) in the logarithmic normal distribution, a probability corresponding to the smooth portion is close to 0, a detection result for a larger data volume is inaccurate, and data support cannot be provided for subsequent abnormal online operational behavior detection. Therefore, to improve the accuracy of abnormal online operational behavior detection, the server converts the data volume in the data volume set and eliminates the smooth portion, so that distribution corresponding to each converted data volume in a data volume set after conversion obeys standard normal distribution.

The conversion herein may be a logarithmic conversion, or may be a simultaneous reduction of a preset multiple, or may be a corresponding multiplication performed on the data volume by using different weights, or the like. This is not specifically limited in this embodiment of this application. The data volume is converted in a process of model obtaining, the data volume described in the processes of model obtaining and model application is a data volume after conversion.

Figure 6A:
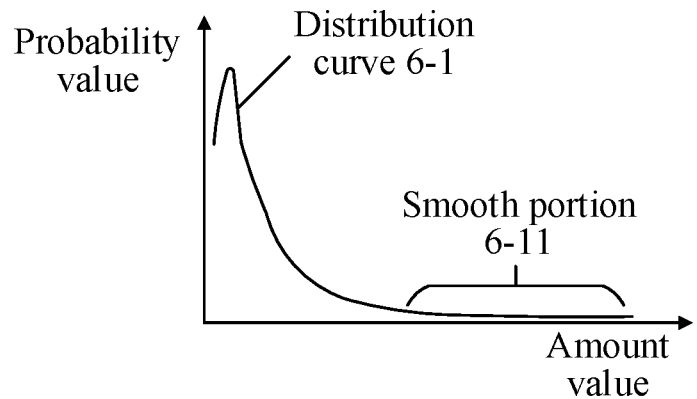
FIG. 6A is an exemplary schematic diagram of a to-be-converted data volume according to an embodiment of this application.
Figure 6B:
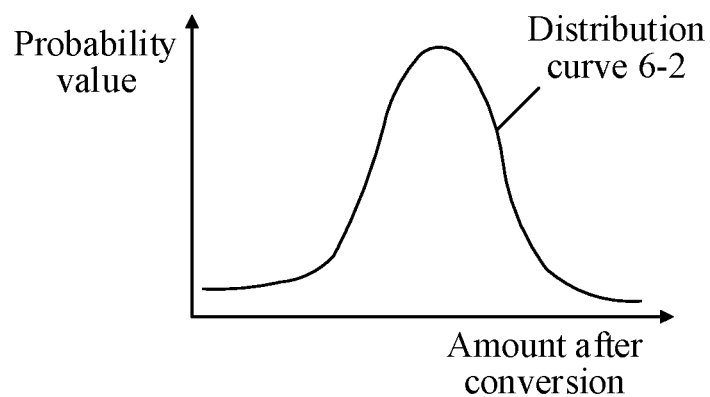
FIG. 6B is an exemplary schematic diagram of data volume conversion according to an embodiment of this application.

Referring to FIG. 6A, when the data volume is an amount value, since an amount value corresponding to micropayment is sometimes small, for example, several yuan, and an amount value corresponding to large payment is sometimes large, for example, hundreds of thousands of yuan, a smooth portion 6-11 may appear in a distribution curve 6-1 corresponding to the data volume, a probability in probability distribution corresponding to the smooth portion 6-11 is almost 0, and data support cannot be provided for subsequent abnormal payment detection. In FIG. 6A, a transverse axis is an amount value, and a longitudinal axis is a probability value. In this case, the data volume is converted by using a natural logarithm (ln), and the distribution curve 6-1 in FIG. 6A is converted into a distribution curve 6-2 in FIG. 6B. In FIG. 6B, a transverse axis is a converted amount value, and a longitudinal axis is a probability value. It is easy to learn that, logarithm-taking operation is performed on the amount value, so that a fluctuation of several yuan can be encoded by the model during the micropayment, and a fluctuation of thousands or even tens of thousands of yuan can be encoded by the model during the large payment. Such a small sensitive and large insensitive trend is consistent with a change curve of a logarithmic function, for example, ln 2−ln 1≅ln 20000−ln 10000.

S30812: Determine a range corresponding to each converted data volume in the converted data volume set as the data volume range.

After obtaining the converted data volume set, the server extracts a minimum converted data volume and a maximum converted data volume from each converted data volume in a data volume set after conversion, where a range between the minimum converted data volume and the maximum converted data volume is the data volume range.

Correspondingly, the collecting, by the server, statistics on a target quantity of data volumes of each target segment in the plurality of target segments from the data volume set described in S3083 includes: collecting, by the server, statistics on a target quantity of converted data volumes of the target segment in the plurality of target segments from the converted data volume set. In other words, the server determines the target segment of the converted data volume in the converted data volume set, to further collect statistics on a quantity of the converted data volumes of the target segment in the plurality of target segments. The quantity of the converted data volumes of the target segment obtained by collecting statistics is the target quantity corresponding to the target segment. In addition, the data volume such as the target data volume is a corresponding data volume after conversion.

In this embodiment of this application, S310 may be implemented through S3101 to S3105. In other words, the traversing, by the server, the first object set, and constructing at least one second object sub-model based on the first sub-model corresponding to the traversed first object includes S3101 to S3105. The steps are described as follows:

S3101: Traverse the first object set, determining a first sub-model corresponding to the 1st traversed first object as a current sub-model, and construct the 1st current sub-model set including the current sub-model.

When the first object set is traversed, a current sub-model set corresponding to an associated second object is an empty set when the traversed first object is the 1st traversed first object. In this case, the server uses first sub-model corresponding to the 1st traversed first object as the current sub-model and an element in the current sub-model set, to construct the 1st current sub-model set.

S3102: Perform the following processing by iterating i: comparing a first sub-model corresponding to a traversed $i^{th}$ first object with each current sub-model in an $(i-1)^{th}$ current sub-model set, to obtain a similar sub-model, 2<i≤I, i being an incremental positive integer variable, and I being a quantity of first objects in the first object set.

When the traversed first object is another first object traversed after the 1st traversed first object, the server compares a first sub-model corresponding to a traversed $i^{th}$ first object with each current sub-model in an $(i-1)^{th}$ current sub-model set, and selects a current sub-model most similar to the first sub-model corresponding to the $i^{th}$ first object from the $(i-1)^{th}$ current sub-model set according to a comparison result, so that the similar sub-model is obtained.

S3103: Merge the first sub-model corresponding to the $i^{th}$ first object and the similar sub-model when a similarity between the first sub-model corresponding to the $i^{th}$ first object and the similar sub-model is greater than a first preset similarity, to obtain a merged sub-model, and replace the similar sub-model in the $(i-1)^{th}$ current sub-model set with the merged sub-model, to obtain an $i^{th}$ current sub-model set.

After obtaining the similar sub-model, the server compares a similarity between the similar sub-model and the first sub-model corresponding to the $i^{th}$ first object with the first preset similarity. When the similarity between the similar sub-model and the first sub-model corresponding to the $i^{th}$ first object is greater than the first preset similarity, it indicates that a first object (for example, a convenience store A) corresponding to the first sub-model corresponding to the $i^{th}$ first object is similar to a first object (for example, convenience store B) corresponding to the similar sub-model in terms of the data volume. In this case, the server merges the first sub-model corresponding to the $i^{th}$ first object and the similar sub-model, and a merged result is the merged sub-model. Then, the server replaces the similar sub-model in the $(i-1)^{th}$ current sub-model set with the merged sub-model, and the $(i-1)^{th}$ current sub-model set after replacement is the $i^{th}$ current sub-model set.

S3104: Insert a to-be-updated sub-model into the current sub-model set when the similarity between the first sub-model corresponding to the $i^{th}$ first object and the similar sub-model is less than or equal to the first preset similarity, to update the current sub-model set.

When the similarity between the similar sub-model and the first sub-model corresponding to the $i^{th}$ first object is less than or equal to the first preset similarity, it indicates that a first object (for example, a convenience store A) corresponding to the first sub-model corresponding to the $i^{th}$ first object is not similar to a first object (for example, convenience store B) corresponding to the similar sub-model in terms of the data volume. In this case, the server inserts the first sub-model corresponding to the $i^{th}$ first object into the $(i-1)^{th}$ current sub-model set, and the $(i-1)^{th}$ current sub-model set after insertion is the $i^{th}$ current sub-model set.

S3105: Determine an $I^{th}$ current sub-model set obtained by iterating i as the at least one second object sub-model.

In this embodiment of this application, when the server traverses the first object set, for any first object in the first object set, a current sub-model set corresponding to a current first object is updated by performing S3102 to S3104. After the first object set is traversed, an obtained current sub-model set after traversal and update is the constructed at least one second object sub-model.

In this embodiment of this application, S3102 further includes S31021 to S31024. In other words, the comparing, by the server, a to-be-updated sub-model corresponding to the current first object in the first preset object model with each current sub-model in a current sub-model set corresponding to each second object, to obtain a similar sub-model includes S31021 to S31024. The steps are described as follows:

S31021: Obtain a plurality of first target probability values corresponding to the plurality of target segments from the first sub-model corresponding to the traversed $i^{th}$ first object.

Since a first sub-model corresponding to each first object is a plurality of probability values corresponding to the plurality of target segments, the first sub-model corresponding to the traversed $i^{th}$ first object also includes the plurality of probability values corresponding to the plurality of target segments, referred to as the first target probability values corresponding to the target segments herein. That is, the plurality of first target probability values corresponding to the plurality of target segments refer to a relationship between a plurality of target segments and a plurality of probability values corresponding to the to-be-updated sub-model. The plurality of target segments and the plurality of first target probability values are in a one-to-one correspondence.

S31022: Obtain a plurality of second target probability values corresponding to the plurality of target segments from the current sub-model in the $(i-1)^{th}$ current sub-model set.

The current sub-model in the $(i-1)^{th}$ current sub-model set also includes the plurality of probability values corresponding to the plurality of target segments, referred to as the plurality of second target probability values corresponding to the plurality of target segments herein. That is, the plurality of second target probability values corresponding to the plurality of target segments refer to a relationship between a plurality of target segments and a plurality of probability values corresponding to the current sub-model. The plurality of target segments and the plurality of second target probability values are in a one-to-one correspondence.

S31023: Compare the plurality of first target probability values with the plurality of second target probability values one by one to obtain a plurality of minimum probability values, and determine an accumulated sum of the plurality of minimum probability values as a similarity between the first sub-model corresponding to the $i^{th}$ first object and the current sub-model.

Since the plurality of first target probability values and the plurality of second target probability values are in a one-to-one correspondence, the server further compares a plurality of first target probability values of the first sub-model corresponding to the traversed $i^{th}$ first object with a plurality of second target probability values of the current sub-model, to determine the similarity between the first sub-model corresponding to the traversed $i^{th}$ first object and the current sub-model. At least one similarity corresponding to at least one current sub-model in the $(i-1)^{th}$ current sub-model set is obtained after the similarity between the first sub-model corresponding to the traversed $i^{th}$ first object and the current sub-model is obtained.

The plurality of minimum probability values and the plurality of first target probability values are in a one-to-one correspondence, the plurality of minimum probability values and the plurality of second target probability values are in a one-to-one correspondence, and the at least one current sub-model in the $(i-1)^{th}$ current sub-model set and the plurality of similarities are in a one-to-one correspondence.

Figure 7:
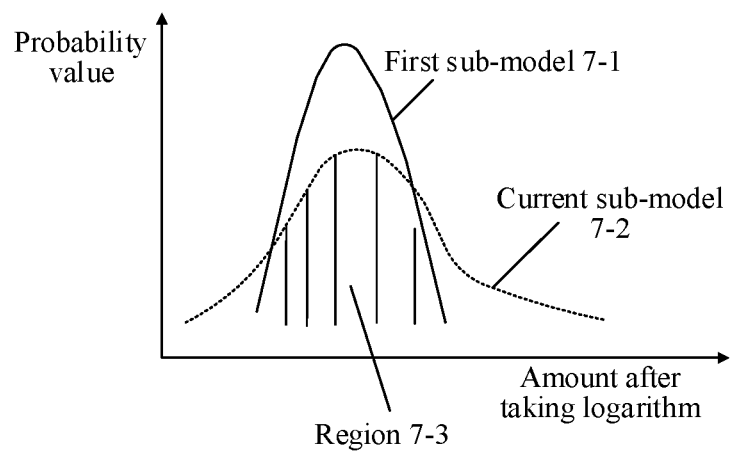
FIG. 7 is an exemplary schematic diagram of obtaining a similarity according to an embodiment of this application.

Referring to FIG. 7, FIG. 7 is an exemplary schematic diagram of obtaining a similarity according to an embodiment of this application. As shown in FIG. 7, in a coordinate system in which a horizontal coordinate is a logarithm-taking amount value and a vertical coordinate is a probability value, a similarity between a first sub-model 7-1 corresponding to the $i^{th}$ first object and each current sub-model 7-2 is an area corresponding to a region 7-3. When a plurality of first target probability values corresponding to the first sub-model 7-1 corresponding to the $i^{th}$ first object is $a_j$, a plurality of second target probability values corresponding to the current sub-model 7-2 is $b_j$, and j is an integer greater than or equal to 2, a similarity S between the first sub-model 7-1 corresponding to the $i^{th}$ first object and the current sub-model 7-2 is shown in formula (1):

$$S=\Sigma_{j=1}^{n} \min(a_j, b_j) \qquad (1), \text{where}$$

n is a quantity of the plurality of target segments.

S31024: Select a highest similarity from determined at least one similarity corresponding to the $(i-1)^{th}$ current sub-model set, and determine a current sub-model corresponding to the highest similarity in the $(i-1)^{th}$ current sub-model set as the similar sub-model.

In this embodiment of this application, the server obtains the highest similarity from the plurality of similarities, and uses a current sub-model corresponding to the highest similarity in the $(i-1)^{th}$ current sub-model set as the similar sub-model.

In this embodiment of this application, the merging, by the server, the first sub-model corresponding to the $i^{th}$ first object and the similar sub-model, to obtain a merged sub-model described in S3103 includes S31031 to S31034. The steps are described as follows:

S31031: Obtain a plurality of first target probability values corresponding to the plurality of target segments from the first sub-model corresponding to the $i^{th}$ first object.

An implementation process of S31031 is consistent with the implementation process described in S31021.

S31032: Obtain a plurality of to-be-merged probability values corresponding to the plurality of target segments from the similar sub-model.

The current sub-model also includes the plurality of probability values corresponding to the plurality of target segments, referred to as the plurality of second target probability values corresponding to the plurality of target segments herein. That is, the plurality of second target probability values corresponding to the plurality of target segments refer to a relationship between a plurality of target segments and a plurality of probability values corresponding to the current sub-model, where the plurality of target segments and the plurality of to-be-merged probability values.

S31033: Compare the plurality of first target probability values with the plurality of to-be-merged probability values one by one, to obtain a plurality of maximum probability values.

The plurality of first target probability values and the plurality of to-be-merged probability values are in a one-to-one correspondence, the plurality of maximum probability values and the plurality of first target probability values are in a one-to-one correspondence, and the plurality of maximum probability values and the plurality of to-be-merged probability values are in a one-to-one correspondence.

S31034: Combine the plurality of target segments and the plurality of maximum probability values, to obtain the merged sub-model.

Figure 8:
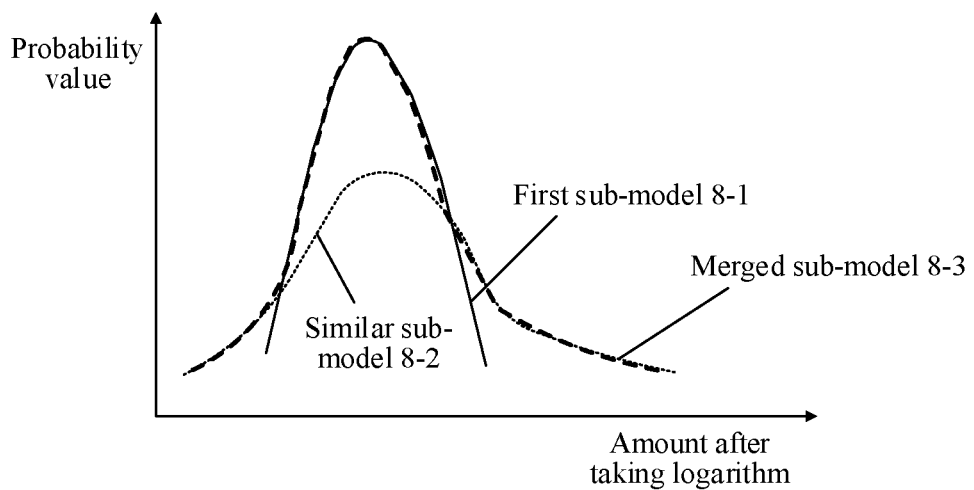
FIG. 8 is an exemplary schematic diagram of obtaining a merged sub-model according to an embodiment of this application.

Referring to FIG. 8, FIG. 8 is an exemplary schematic diagram of obtaining a merged sub-model according to an embodiment of this application. As shown in FIG. 8, in a coordinate system in which a horizontal coordinate is a logarithm-taking amount value and a vertical coordinate is a probability value, a first sub-model 8-1 corresponding to the $i^{th}$ first object and a merged sub-model 8-3 corresponding to a similar sub-model 8-2 are shown. When a plurality of first target probability values corresponding to the first sub-model 8-1 corresponding to the $i^{th}$ first object is $a_j$, and a plurality of to-be-merged probability values corresponding to the similar sub-model 8-2 is $c_j$, a process in which the first sub-model 8-1 corresponding to the $i^{th}$ first object and the similar sub-model 8-2 are merged to obtain the merged sub-model 8-3 may be implemented by using formula (2), which is expressed as follows:

$$C=\{\ldots,\max(a_j,c_j),\ldots\}, i \in n \qquad (2), \text{where}$$

C is used for representing the merged sub-model 8-3.

In this embodiment of this application, S304 may be implemented through S3041 to S3044. In other words, the obtaining, by the server, a second target sub-model corresponding to the second target object and having a highest similarity with the first target sub-model from a second preset object model includes S3041 to S3044. The steps are described as follows:

S3041: Obtain at least one target second object sub-model corresponding to the second target object from the second preset object model.

Since the second object sub-model is obtained by combining at least one second preset object model corresponding to each second object, the server matches the second target object with the second object in the second preset object model, and at least one second object sub-model corresponding to a matched second object is the at least one target second object sub-model.

S3042: Obtain at least one target similarity between the first target sub-model and the at least one target second object sub-model.

In this embodiment of this application, the server compares the first target sub-model with each target second object sub-model, so that a target similarity between the first target sub-model and the target second object sub-model is obtained, and the at least one target similarity corresponding to the at least one target second object sub-model is obtained. The at least one target second object sub-model and the at least one target similarity are in a one-to-one correspondence.

A process of obtaining a plurality of target similarities by the server is similar to the processes of obtaining a plurality of similarities described in S31011 to S31013. Details are not described again in this embodiment of this application.

S3043: Obtain a highest target similarity from the at least one target similarity.

The highest target similarity is a target similarity that is highest in the at least one target similarity corresponding to the at least one target second object sub-model.

S3044: Determine a target second object sub-model corresponding to the highest target similarity in the at least one target second object sub-model as the second target sub-model.

The server selects a corresponding target second object sub-model from the at least one target second object sub-model according to the highest target similarity, and determines the selected target second object sub-model corresponding to the highest target similarity as the second target sub-model. The second target sub-model has the highest similarity with the first target sub-model.

In this embodiment of this application, the obtaining, by the server, a target maximum data volume corresponding to the second target sub-model described in S305 includes: determining, by the server, a maximum data volume corresponding to the second target object in the second preset object model as the target maximum data volume corresponding to the second target sub-model when the highest target similarity is greater than a second preset similarity; and determining, by the server, a preset data volume as the target maximum data volume corresponding to the second target sub-model when the highest target similarity is less than or equal to the second preset similarity. The preset data volume may be, for example, 0 or any other value. In addition, the first preset similarity and the second preset similarity may be the same or different. This is not specifically limited in this embodiment of this application.

The following describes an exemplary application of this embodiment of this application in an actual application scenario by using an example in which abnormality detection is performed on a payment order in a payment scenario of an instant messaging client.

Figure 9:
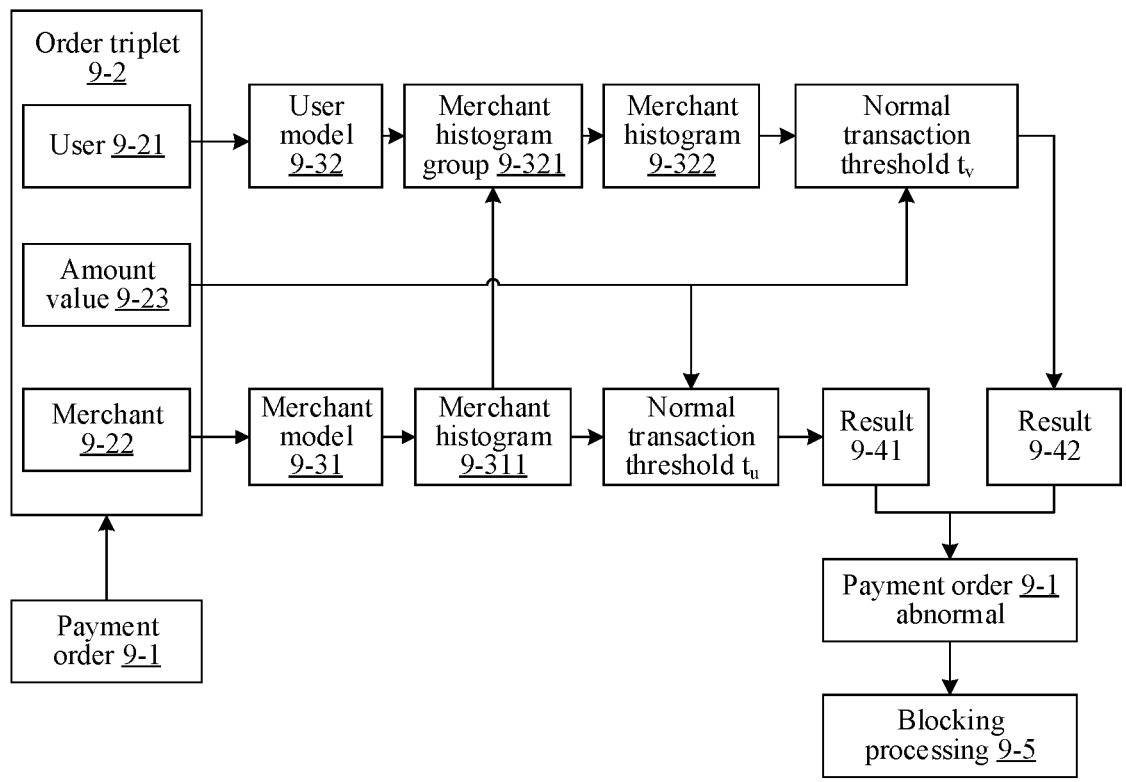
FIG. 9 is an exemplary schematic flowchart of abnormal online operational behavior detection according to an embodiment of this application.

Referring to FIG. 9, FIG. 9 is an exemplary schematic flowchart of abnormal online operational behavior detection according to an embodiment of this application. As shown in FIG. 9, in a payment scenario, after a user submits a payment order 9-1 (online operation behavior information), first, before the payment is completed according to the payment order, the server pulls the payment order and obtains an order triplet 9-2 from the payment order: a user 9-21 (a first target object), a merchant 9-22 (a first target object), and an amount value 9-23 (a target data volume).

Then, the server obtains a merchant histogram 9-311 (a first target sub-model) corresponding to the merchant 9-22 from a merchant model 9-31 (a first preset object model), and determines a normal transaction threshold $t_u$ (an abnormal data volume) of the merchant 9-22 according to a $99^{th}$ quantile (a preset model parameter) of the merchant histogram 9-311; The process of determining the normal transaction threshold $t_u$, is shown in FIG. 4. It is easy to learn that, the normal transaction threshold $t_u$ indicates that, when an amount value is greater than the normal transaction threshold $t_u$, a payment order corresponding to the amount value exceeds 99% of the normal situation, and it is determined that the payment order corresponding to the amount value is an abnormal transaction on a merchant side. Since the amount value 9-23 is greater than the normal transaction threshold $t_u$, it indicates that the payment order 9-1 exceeds 99% of the normal situation, and it is determined that the payment order 9-1 is of a result 9-41 (a first detection result) of abnormal transaction on the merchant side.

Then, the server obtains a merchant histogram group 9-321 (at least one target second object sub-model) corresponding to the user 9-21 from a user model 9-32 (a second preset object model), and searches the merchant histogram group 9-321 for a merchant histogram 9-322 (a second target sub-model) most similar to the merchant histogram 9-311. When a similarity between the merchant histogram 9-322 and the merchant histogram group 9-321 is greater than 0.8 (a second preset similarity), a historical maximum transaction amount (a maximum data volume corresponding to a second target object) corresponding to the user 9-21 in the user model 9-32 is obtained as the normal transaction $t_v$ (a target maximum data volume). Otherwise, it indicates that the user 9-21 has not consumed at the merchant 9-22, and the normal transaction threshold $t_v$ is set to 0 (a preset data volume). It is easy to learn that, the normal transaction threshold $t_v$ indicates that, when an amount value is less than or equal to the normal transaction threshold $t_v$, it indicates that the amount value has the same amount value in a historical payment order, and it is determined that a payment order corresponding to the amount value is a normal transaction on a user side. Since the amount value 9-23 is greater than the normal transaction threshold $t_v$, it indicates that the amount value 9-23 has not appeared in the historical payment order, and it is determined that the payment order 9-1 is of a result 9-42 (a second detection result) of abnormal transaction on the user side.

Finally, the payment order 9-1 is determined to be abnormal (a target detection result) according to a decision matrix shown in Table 1 with reference to the result 9-41 and the result 9-42, which may be a transaction performed by a stolen account. In view of this, blocking processing 9-5 is performed on the payment order 9-1 to improve the network security.

TABLE 1

| User side | Merchant side | |
| --- | --- | --- |
| | Abnormal | Normal |
| Abnormal | Abnormal payment | Suspected abnormal payment |
| Normal | Normal payment | Normal payment |

It is easy to learn from the decision matrix shown in FIG. 1 that, the payment order is determined to be abnormal when the merchant side indicates that the payment order is abnormal and the user side indicates that the payment order is also abnormal; the payment order is determined to be normal when the merchant side indicates that the payment order is abnormal and the user side indicates that the payment order is normal; the payment order is determined to be a suspected abnormal payment when the merchant side indicates that the payment order is normal and the user side indicates that the payment order is abnormal, where in this case, abnormality of the payment order is determined according to an actual situation, that is, the payment order may be considered as normal or abnormal according to the actual situation; and the payment order is determined to be normal when the merchant side indicates that the payment order is normal and the user side also indicates that the payment order is normal.

In addition, an embodiment of this application further provides another decision matrix, which is shown in Table 2:

TABLE 2

| User side | Merchant side | |
| --- | --- | --- |
| | Abnormal | Normal |
| Abnormal | Abnormal payment | Suspected abnormal payment |
| Normal | Suspected abnormal payment | Normal payment |

It is easy to learn from the decision matrix shown in FIG. 2 that, the payment order is determined to be abnormal when the merchant side indicates that the payment order is abnormal and the user side indicates that the payment order is also abnormal; the payment order is determined to be a suspected abnormal payment when the merchant side indicates that the payment order is abnormal and the user side indicates that the payment order is normal, where in this case, abnormality of the payment order is determined according to an actual situation, that is, the payment order may be considered as normal or abnormal according to the actual situation; the payment order is determined to be a suspected abnormal payment when the merchant side indicates that the payment order is normal and the user side indicates that the payment order is abnormal, where in this case, abnormality of the payment order is determined according to an actual situation, that is, the payment order may be considered as normal or abnormal according to the actual situation; and the payment order is determined to be normal when the merchant side indicates that the payment order is normal and the user side also indicates that the payment order is normal.

There may be another decision matrix when the server determines the target detection result according to the first detection result and the second detection result. This is not listed one by one in this embodiment of this application.

In addition, the foregoing process of determining the abnormality of the payment order is real-time, which is implemented in a real-time/online environment. The foregoing process of determining the abnormality of the payment order may further be applied to a scenario such as credit card anti-spoofing or black market confrontation.

It may be understood that, in the payment scenario of the instant messaging client, abnormality detection is performed, and processing such as payment blocking or authentication is performed when the payment is determined to be abnormal based on a detection result, so that payment security of the instant messaging client can be ensured.

The following continues to describe the application of abnormal online operational behavior detection in the payment scenario.

Figure 10:
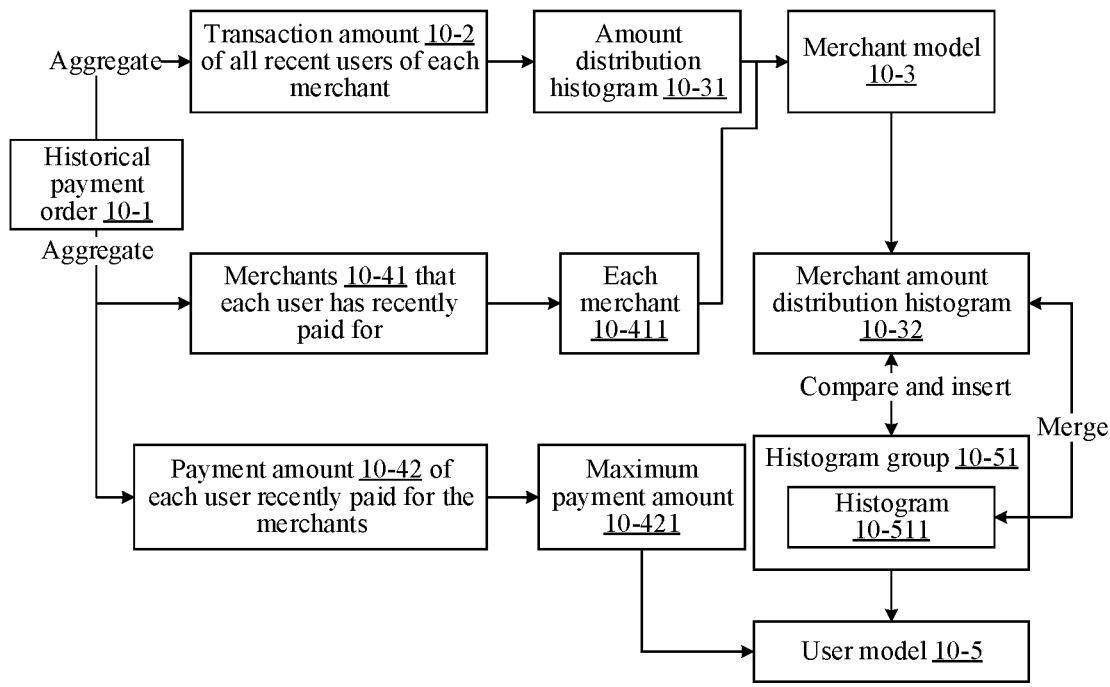
FIG. 10 is an exemplary schematic diagram of obtaining a model according to an embodiment of this application.

Referring to FIG. 10, FIG. 10 is an exemplary schematic diagram of obtaining a model according to an embodiment of this application. As shown in FIG. 10, the server obtains a historical payment order 10-1 (a behavior information sample) recently generated (in a current preset cycle), where each payment order in the historical payment order 10-1 includes a user (a second object), a merchant (a first object), and an amount (a data volume).

Figure 11:
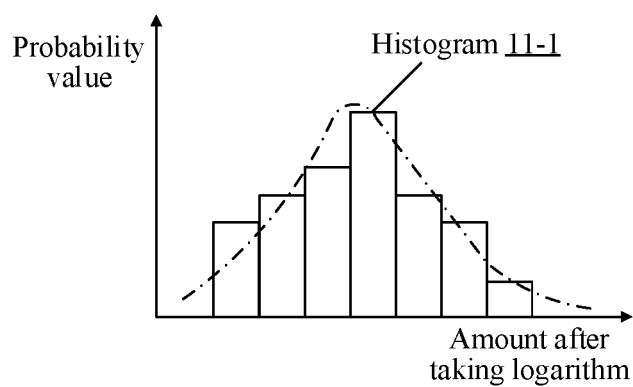
FIG. 11 is an exemplary schematic diagram of a model according to an embodiment of this application.

First, the historical payment order 10-1 is aggregated according to the merchant (a first preset object type) to obtain a transaction amount 10-2 (a data volume set) of all recent users of each merchant; after the transaction amount 10-2 of all the recent users of the merchant is converted by using a natural logarithm, segmented statistics is collected, to obtain an amount distribution histogram 10-31 (a first sub-model), where a histogram 11-1 shown in FIG. 11 is the amount distribution histogram 10-31 in FIG. 10, and in a coordinate system, a horizontal coordinate is logarithm-taking amount value and a vertical coordinate is a probability value; and the amount distribution histogram 10-31 corresponding to the merchant is combined, to obtain a merchant model 10-3.

Further, the historical payment order 10-1 is aggregated according to the user (a second preset object type) to obtain merchants 10-41 (a first object set) that each user has recently paid for and a payment amount 10-42 of the user recently paid for the merchants, and selects a maximum payment amount 10-421 (a maximum data volume) from the payment amount 10-42 of the user recently paid for the merchants as a historical maximum payment amount.

Then, the merchants 10-41 that each user has recently paid for are traversed, a corresponding merchant amount distribution histogram 10-32 is obtained from the merchant model 10-3 for each merchant 10-411 (an $i^{th}$ first object). The merchant amount distribution histogram 10-32 is directly inserted into a histogram group 10-51 (a current sub-model set) when each merchant 10-411 is the first traversed merchant in the merchants 10-41; and the merchant amount distribution histogram 10-32 is compared with each histogram in the histogram group 10-51 when each merchant 10-411 is not the first traversed merchant in the merchants 10-41, to compare a histogram 10-511 (a similar sub-model) with the highest similarity from the histogram group 10-51. The comparison process is shown in FIG. 7. The merchant amount distribution histogram 10-32 is merged into the histogram 10-511 when a similarity between the histogram 10-511 and the merchant amount distribution histogram 10-32 is greater than 0.8 (a first preset similarity), where the merging process is shown in FIG. 8; and the merchant amount distribution histogram 10-32 is inserted into the histogram group 10-51 when the similarity between the histogram 10-511 and the merchant amount distribution histogram 10-32 is less than or equal to 0.8. In this way, after the merchants 10-41 are traversed (where the histogram group 10-51 is at least one second object sub-model), the histogram group 10-51 corresponding to each user is combined with the maximum payment amount 10-421 to obtain the second sub-model, so that a user model 10-5 (a second preset object model) is obtained.

The process of obtaining the first preset object model and the second preset object model may be performed in an offline environment.

It may be understood that, the abnormal online operational behavior detection method provided in the embodiments of this application is performed in an unsupervised manner, and there is no need to label, thereby improving the enforceability of detection in the payment scenario of the instant messaging client. Furthermore, in the process of obtaining the merchant model and the user model, only the merchant, the user, and the amount value are required, so that abnormal online operational behavior detection in the payment scenario of the instant messaging client may be accurately implemented even when there are three dimensional features. In addition, since data annotation is not required for obtaining the merchant model and the user model, the obtaining efficiency is improved, so that the obtained merchant model and the user model are time-based and can be applied to a real-time payment environment of the instant messaging client.

The following further describes an exemplary structure in which the abnormal online operational behavior detection apparatus 455 provided in this embodiment of this application is implemented as software modules. In some embodiments, as shown in FIG. 2, the software module stored in the abnormal online operational behavior detection apparatus 455 of the memory 450 may include:

an information obtaining module 4551, configured to acquire online operation behavior information, the online operation behavior information including a first target object, a second target object, and a target data volume;

a first detection module 4552, configured to obtain a first target sub-model corresponding to the first target object from a first preset object model, the first detection module 4552 being further configured to determine an abnormal data volume from the first target sub-model based on a preset model parameter, and determine a first detection result corresponding to the online operation behavior information based on a comparison result between the target data volume and the abnormal data volume;

a second detection module 4553, configured to obtain a second target sub-model corresponding to the second target object and having a highest similarity with the first target sub-model from a second preset object model, the second detection module 4553 being further configured to obtain a target maximum data volume corresponding to the second target sub-model, and determine a second detection result corresponding to the online operation behavior information based on a comparison result between the target data volume and the target maximum data volume; and a result determination module 4554, configured to determine a target detection result of the online operation behavior information in accordance with the first detection result and the second detection result.

In this embodiment of this application, the abnormal online operational behavior detection apparatus 455 further includes a model obtaining module 4555, configured to: obtain a behavior information sample; aggregate the behavior information sample according to a first preset object type to obtain a data volume set corresponding to each first object, construct a first sub-model corresponding to the first object according to the data volume set, and determine each constructed first sub-model corresponding to the first object as the first preset object model; aggregate the behavior information sample according to a second preset object type, to obtain a first object set and a maximum data volume corresponding to each second object; traverse the first object set, and constructing at least one second object sub-model based on the first sub-model corresponding to the traversed first object; and combine the at least one second object sub-model and the maximum data volume into a second sub-model corresponding to the second object, and determine each combined second sub-model corresponding to the second object as the second preset object model.

In this embodiment of this application, the model obtaining module 4555 is further configured to: obtain a data volume range corresponding to each data volume in the data volume set; segment the data volume range to obtain a plurality of target segments; collect statistics on a target quantity of data volumes of each target segment in the plurality of target segments from the data volume set; determine a ratio of the target quantity to a set element quantity corresponding to the data volume set as a probability value corresponding to the target segment; and determine a plurality of determined probability values corresponding to the plurality of target segments as the first sub-model corresponding to the first object.

In this embodiment of this application, the model obtaining module 4555 is further configured to: convert the data volume in the data volume set, to obtain a converted data volume set; and determine a range corresponding to each converted data volume in the converted data volume set as the data volume range.

In this embodiment of this application, the model obtaining module 4555 is further configured to collect statistics on a target quantity of converted data volumes of the target segment in the plurality of target segments from the converted data volume set.

In this embodiment of this application, the model obtaining module 4555 is further configured to: traverse the first object set, determine a first sub-model corresponding to the 1st traversed first object as a current sub-model, and construct the 1st current sub-model set including the current sub-model; and perform the following processing by iterating i: comparing a first sub-model corresponding to a traversed $i^{th}$ first object with each current sub-model in an $(i-1)^{th}$ current sub-model set, to obtain a similar sub-model, $2<i\le I$, i being an incremental positive integer variable, and I being a quantity of first objects in the first object set; merge the first sub-model corresponding to the $i^{th}$ first object and the similar sub-model when a similarity between the first sub-model corresponding to the $i^{th}$ first object and the similar sub-model is greater than a first preset similarity, to obtain a merged sub-model, and replace the similar sub-model in the $(i-1)^{th}$ current sub-model set with the merged sub-model, to obtain an $i^{th}$ current sub-model set; insert the first sub-model corresponding to the $i^{th}$ first object into the $(i-1)^{th}$ current sub-model set when the similarity between the first sub-model corresponding to the $i^{th}$ first object and the similar sub-model is less than or equal to the first preset similarity, to obtain the $i^{th}$ current sub-model set; and determine an $I^{th}$ current sub-model set obtained by iterating i as the at least one second object sub-model.

In this embodiment of this application, the model obtaining module 4555 is further configured to: obtain a plurality of first target probability values corresponding to the plurality of target segments from the first sub-model corresponding to the traversed $i^{th}$ first object; obtain a plurality of second target probability values corresponding to the plurality of target segments from the current sub-model in the $(i-1)^{th}$ current sub-model set; compare the plurality of first target probability values with the plurality of second target probability values one by one to obtain a plurality of minimum probability values, and determine an accumulated sum of the plurality of minimum probability values as a similarity between the first sub-model corresponding to the $i^{th}$ first object and the current sub-model; and select a highest similarity from determined at least one similarity corresponding to the $(i-1)^{th}$ current sub-model set, and determine a current sub-model corresponding to the highest similarity in the $(i-1)^{th}$ current sub-model set as the similar sub-model.

In this embodiment of this application, the model obtaining module 4555 is further configured to: obtain a plurality of first target probability values corresponding to the plurality of target segments from the first sub-model corresponding to the $i^{th}$ first object; obtain a plurality of to-be-merged probability values corresponding to the plurality of target segments from the similar sub-model; compare the plurality of first target probability values with the plurality of to-be-merged probability values one by one, to obtain a plurality of maximum probability values; and combine the plurality of target segments and the plurality of maximum probability values, to obtain the merged sub-model.

In this embodiment of this application, the second detection module 4553 is further configured to: obtain at least one target second object sub-model corresponding to the second target object from the second preset object model; obtain at least one target similarity between the first target sub-model and the at least one target second object sub-model; obtain a highest target similarity from the at least one target similarity; and determine a target second object sub-model corresponding to the highest target similarity in the at least one target second object sub-model as the second target sub-model.

In this embodiment of this application, the second detection module 4553 is further configured to: determine a maximum data volume corresponding to the second target object in the second preset object model as the target maximum data volume corresponding to the second target sub-model when the highest target similarity is greater than a second preset similarity; and determine a preset data volume as the target maximum data volume corresponding to the second target sub-model when the highest target similarity is less than or equal to the second preset similarity.

In this embodiment of this application, the first detection module 4552 is further configured to: determine, when the target data volume is greater than the abnormal data volume, that the online operation behavior information is abnormal with respect to the first target object, the first detection result being that the online operation behavior information is abnormal with respect to the first target object; and determine, when the target data volume is less than or equal to the abnormal data volume, that the online operation behavior information is normal with respect to the first target object, the first detection result being that the online operation behavior information is normal with respect to the first target object.

In this embodiment of this application, the second detection module 4553 is further configured to: determine, when the target data volume is greater than the target maximum data volume, that the online operation behavior information is abnormal with respect to the second target object, the second detection result being that the online operation behavior information is abnormal with respect to the second target object; and determine, when the target data volume is less than or equal to the target maximum data volume, that the online operation behavior information is normal with respect to the second target object, the second detection result being that the online operation behavior information is normal with respect to the second target object.

In this embodiment of this application, the result determination module 4554 is further configured to: when the first detection result is that the online operation behavior information is abnormal with respect to the first target object and the second detection result is that the online operation behavior information is abnormal with respect to the second target object, determine the target detection result including that the online operation behavior information is abnormal; when the first detection result is that the online operation behavior information is normal with respect to the first target object and the second detection result is that the online operation behavior information is abnormal with respect to the second target object, determine the target detection result including that the online operation behavior information is abnormal; when the first detection result is that the online operation behavior information is normal with respect to the first target object and the second detection result is that the online operation behavior information is normal with respect to the second target object, determine the target detection result including that the online operation behavior information is normal; and when the first detection result is that the online operation behavior information is abnormal with respect to the first target object and the second detection result is that the online operation behavior information is normal with respect to the second target object, determine the target detection result including that the online operation behavior information is normal; and An embodiment of this application provides a computer program product or a computer program. The computer program product or the computer program includes computer instructions, and the computer instructions are stored in a computer-readable storage medium. A processor of an abnormal online operational behavior detection device reads the computer instructions from the computer-readable storage medium. The processor executes the computer instructions, to cause the computer device to perform the abnormal online operational behavior detection method of the embodiments of this application.

An embodiment of this application provides a computer-readable storage medium storing executable instructions, the executable instructions, when executed by a processor, causing the processor to perform the abnormal online operational behavior detection method provided in the embodiments of this application, for example, the abnormal online operational behavior detection method shown in FIG. 3.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

Based on the above, in the embodiments of this application, when the online operation behavior information includes three dimensional features of the first target object, the second target object, and the target data volume, when the target detection result of whether the online operation behavior information is abnormal is determined with reference to results of respectively comparing the target data volume with the abnormal data volume and the target maximum data volume, since the abnormal data volume is an abnormality judgment condition for the first target object determined based on the first preset object model, and the target maximum data volume is an abnormality judgment condition for the second target object determined based on the second preset object model, in a low-dimensional feature, whether the target data volume is within a preset interval is determined from two dimensions of the first target object and the second target object, to further accurately obtain the target detection result of whether the online operation behavior information is abnormal, so that the accuracy of abnormal online operational behavior detection is relatively high.

The foregoing descriptions are merely embodiments of this application and are not intended to limit the protection scope of this application. Any modification, equivalent replacement, or improvement made without departing from the spirit and range of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. An abnormal online operational behavior detection method, performed by an electronic device, the method comprising:
acquiring online operation behavior information, the online operation behavior information comprising a first target object, a second target object, and a target data volume;
obtaining a first target sub-model corresponding to the first target object from a first preset object model;

determining an abnormal data volume from the first target sub-model based on a preset model parameter, and determining a first detection result corresponding to the online operation behavior information based on a comparison result between the target data volume and the abnormal data volume;

obtaining a second target sub-model corresponding to the second target object and having a highest similarity with the first target sub-model from a second preset object model;

obtaining a target maximum data volume corresponding to the second target sub-model, and determining a second detection result corresponding to the online operation behavior information based on a comparison result between the target data volume and the target maximum data volume; and determining a target detection result of the online operation behavior information in accordance with the first detection result and the second detection result, further including:

when the first detection result is that the online operation behavior information is abnormal with respect to the first target object and the second detection result is that the online operation behavior information is abnormal with respect to the second target object, determining the target detection result comprising that the online operation behavior information is abnormal;

when the first detection result is that the online operation behavior information is normal with respect to the first target object and the second detection result is that the online operation behavior information is normal with respect to the second target object, determining the target detection result comprising that the online operation behavior information is normal;

when the first detection result is that the online operation behavior information is abnormal with respect to the first target object and the second detection result is that the online operation behavior information is normal with respect to the second target object, determining the target detection result comprising that the online operation behavior information is suspected abnormal; and when the first detection result is that the online operation behavior information is normal with respect to the first target object and the second detection result is that the online operation behavior information is abnormal with respect to the second target object, determining the target detection result comprising that the online operation behavior information is suspected abnormal.

2. The method according to claim 1, wherein the first preset object model and the second preset object model are generated by:

obtaining a behavior information sample;

aggregating the behavior information sample according to a first preset object type to obtain a data volume set corresponding to each first object, constructing a first sub-model corresponding to the first object according to the data volume set, and determining each constructed first sub-model corresponding to the first object as the first preset object model;

aggregating the behavior information sample according to a second preset object type, to obtain a first object set and a maximum data volume corresponding to each second object;

traversing the first object set, and constructing at least one second object sub-model based on the first sub-model corresponding to the traversed first object; and combining the at least one second object sub-model and the maximum data volume into a second sub-model corresponding to the second object, and determining each combined second sub-model corresponding to the second object as the second preset object model.

3. The method according to claim 2, wherein the constructing a first sub-model corresponding to the first object according to the data volume set comprises:

obtaining a data volume range corresponding to each data volume in the data volume set;

segmenting the data volume range to obtain a plurality of target segments;

collecting statistics on a target quantity of data volumes of each target segment in the plurality of target segments from the data volume set;

determining a ratio of the target quantity to a set element quantity corresponding to the data volume set as a probability value corresponding to the target segment; and determining a plurality of determined probability values corresponding to the plurality of target segments as the first sub-model corresponding to the first object.

4. The method according to claim 3, wherein the obtaining a data volume range corresponding to each data volume in the data volume set comprises:

converting the data volume in the data volume set, to obtain a converted data volume set; and determining a range corresponding to each converted data volume in the converted data volume set as the data volume range; and the collecting statistics on a target quantity of data volumes of each target segment in the plurality of target segments from the data volume set comprises:

collecting statistics on a target quantity of converted data volumes of the target segment in the plurality of target segments from the converted data volume set.

5. The method according to claim 2, wherein the traversing the first object set, and constructing at least one second object sub-model based on the first sub-model corresponding to the traversed first object comprises:

traversing the first object set, determining a first sub-model corresponding to the first traversed first object as a current sub-model, and constructing the first current sub-model set comprising the current sub-model; and performing the following processing by iterating i:

comparing a first sub-model corresponding to a traversed $i^{th}$ first object with each current sub-model in an $(i-1)^{th}$ current sub-model set, to obtain a similar sub-model, $2 < i \leq I$, i being an incremental positive integer variable, and I being a quantity of first objects in the first object set;

merging the first sub-model corresponding to the $i^{th}$ first object and the similar sub-model when a similarity between the first sub-model corresponding to the $i^{th}$ first object and the similar sub-model is greater than a first preset similarity, to obtain a merged sub-model, and replacing the similar sub-model in the $(i-1)^{th}$ current sub-model set with the merged sub-model, to obtain an $i^{th}$ current sub-model set;

inserting the first sub-model corresponding to the $i^{th}$ first object into the $(i-1)^{th}$ current sub-model set when the similarity between the first sub-model corresponding to the $i^{th}$ first object and the similar sub-model is less than or equal to the first preset similarity, to obtain the $i^{th}$ current sub-model set; and determining an $I^{th}$ current sub-model set obtained by iterating i as the at least one second object sub-model.

6. The method according to claim 5, wherein the comparing a first sub-model corresponding to a traversed $i^{th}$ first object with each current sub-model in an $(i-1)^{th}$ current sub-model set, to obtain a similar sub-model comprises:

obtaining a plurality of first target probability values corresponding to the plurality of target segments from the first sub-model corresponding to the traversed $i^{th}$ first object;

obtaining a plurality of second target probability values corresponding to the plurality of target segments from the current sub-model in the $(i-1)^{th}$ current sub-model set;

comparing the plurality of first target probability values with the plurality of second target probability values one by one to obtain a plurality of minimum probability values, and determining an accumulated sum of the plurality of minimum probability values as a similarity between the first sub-model corresponding to the $i^{th}$ first object and the current sub-model; and selecting a highest similarity from determined at least one similarity corresponding to the $(i-1)^{th}$ current sub-model set, and determining a current sub-model corresponding to the highest similarity in the $(i-1)^{th}$ current sub-model set as the similar sub-model.

7. The method according to claim 5, wherein the merging the first sub-model corresponding to the $i^{th}$ first object and the similar sub-model, to obtain a merged sub-model comprises:

obtaining a plurality of first target probability values corresponding to the plurality of target segments from the first sub-model corresponding to the $i^{th}$ first object;

obtaining a plurality of to-be-merged probability values corresponding to the plurality of target segments from the similar sub-model;

comparing the plurality of first target probability values with the plurality of to-be-merged probability values one by one, to obtain a plurality of maximum probability values; and combining the plurality of target segments and the plurality of maximum probability values, to obtain the merged sub-model.

8. The method according to claim 1, wherein the obtaining a second target sub-model corresponding to the second target object and having a highest similarity with the first target sub-model from a second preset object model comprises:

obtaining at least one target second object sub-model corresponding to the second target object from the second preset object model;

obtaining at least one target similarity between the first target sub-model and the at least one target second object sub-model;

obtaining a highest target similarity from the at least one target similarity; and determining a target second object sub-model corresponding to the highest target similarity in the at least one target second object sub-model as the second target sub-model.

9. The method according to claim 8, wherein the obtaining a target maximum data volume corresponding to the second target sub-model comprises:

determining a maximum data volume corresponding to the second target object in the second preset object model as the target maximum data volume corresponding to the second target sub-model when the highest target similarity is greater than a second preset similarity; and determining a preset data volume as the target maximum data volume corresponding to the second target sub-model when the highest target similarity is less than or equal to the second preset similarity.

10. The method according to claim 1, wherein the determining a first detection result corresponding to the online operation behavior information based on a comparison result between the target data volume and the abnormal data volume comprises:

determining, when the target data volume is greater than the abnormal data volume, that the online operation behavior information is abnormal with respect to the first target object, the first detection result being that the online operation behavior information is abnormal with respect to the first target object; and determining, when the target data volume is less than or equal to the abnormal data volume, that the online operation behavior information is normal with respect to the first target object, the first detection result being that the online operation behavior information is normal with respect to the first target object.

11. The method according to claim 1, wherein the determining a second detection result corresponding to the online operation behavior information based on a comparison result between the target data volume and the target maximum data volume comprises:

determining, when the target data volume is greater than the target maximum data volume, that the online operation behavior information is abnormal with respect to the second target object, the second detection result being that the online operation behavior information is abnormal with respect to the second target object; and determining, when the target data volume is less than or equal to the target maximum data volume, that the online operation behavior information is normal with respect to the second target object, the second detection result being that the online operation behavior information is normal with respect to the second target object.

12. An electronic device for detecting abnormal online operational behaviors, comprising:

a memory, configured to store executable instructions; and a processor, configured to implement, when executing the executable instructions stored in the memory, an abnormal online operational behavior detection method including:

acquiring online operation behavior information, the online operation behavior information comprising a first target object, a second target object, and a target data volume;

obtaining a first target sub-model corresponding to the first target object from a first preset object model;

determining an abnormal data volume from the first target sub-model based on a preset model parameter, and determining a first detection result corresponding to the online operation behavior information based on a comparison result between the target data volume and the abnormal data volume;

obtaining a second target sub-model corresponding to the second target object and having a highest similarity with the first target sub-model from a second preset object model;

obtaining a target maximum data volume corresponding to the second target sub-model, and determining a second detection result corresponding to the online operation behavior information based on a comparison result between the target data volume and the target maximum data volume; and determining a target detection result of the online operation behavior information in accordance with the first detection result and the second detection result determining a target detection result of the online operation behavior information in accordance with the first detection result and the second detection result, further including:

when the first detection result is that the online operation behavior information is abnormal with respect to the first target object and the second detection result is that the online operation behavior information is abnormal with respect to the second target object, determining the target detection result comprising that the online operation behavior information is abnormal;

when the first detection result is that the online operation behavior information is normal with respect to the first target object and the second detection result is that the online operation behavior information is normal with respect to the second target object, determining the target detection result comprising that the online operation behavior information is normal;

when the first detection result is that the online operation behavior information is abnormal with respect to the first target object and the second detection result is that the online operation behavior information is normal with respect to the second target object, determining the target detection result comprising that the online operation behavior information is suspected abnormal; and when the first detection result is that the online operation behavior information is normal with respect to the first target object and the second detection result is that the online operation behavior information is abnormal with respect to the second target object, determining the target detection result comprising that the online operation behavior information is suspected abnormal.

13. The electronic device according to claim 12, wherein the first preset object model and the second preset object model are generated by:

obtaining a behavior information sample;

aggregating the behavior information sample according to a first preset object type to obtain a data volume set corresponding to each first object, constructing a first sub-model corresponding to the first object according to the data volume set, and determining each constructed first sub-model corresponding to the first object as the first preset object model;

aggregating the behavior information sample according to a second preset object type, to obtain a first object set and a maximum data volume corresponding to each second object;

traversing the first object set, and constructing at least one second object sub-model based on the first sub-model corresponding to the traversed first object; and combining the at least one second object sub-model and the maximum data volume into a second sub-model corresponding to the second object, and determining each combined second sub-model corresponding to the second object as the second preset object model.

14. The electronic device according to claim 12, wherein the obtaining a second target sub-model corresponding to the second target object and having a highest similarity with the first target sub-model from a second preset object model comprises:

obtaining at least one target second object sub-model corresponding to the second target object from the second preset object model;

obtaining at least one target similarity between the first target sub-model and the at least one target second object sub-model;

obtaining a highest target similarity from the at least one target similarity; and determining a target second object sub-model corresponding to the highest target similarity in the at least one target second object sub-model as the second target sub-model.

15. The electronic device according to claim 12, wherein the determining a first detection result corresponding to the online operation behavior information based on a comparison result between the target data volume and the abnormal data volume comprises:

determining, when the target data volume is greater than the abnormal data volume, that the online operation behavior information is abnormal with respect to the first target object, the first detection result being that the online operation behavior information is abnormal with respect to the first target object; and determining, when the target data volume is less than or equal to the abnormal data volume, that the online operation behavior information is normal with respect to the first target object, the first detection result being that the online operation behavior information is normal with respect to the first target object.

16. The electronic device according to claim 12, wherein the determining a second detection result corresponding to the online operation behavior information based on a comparison result between the target data volume and the target maximum data volume comprises:

determining, when the target data volume is greater than the target maximum data volume, that the online operation behavior information is abnormal with respect to the second target object, the second detection result being that the online operation behavior information is abnormal with respect to the second target object; and determining, when the target data volume is less than or equal to the target maximum data volume, that the online operation behavior information is normal with respect to the second target object, the second detection result being that the online operation behavior information is normal with respect to the second target object.

17. A non-transitory computer-readable storage medium, storing executable instructions that, when executed by a processor of an electronic device, cause the electronic device to implement an abnormal online operational behavior detection method including:

acquiring online operation behavior information, the online operation behavior information comprising a first target object, a second target object, and a target data volume;

obtaining a first target sub-model corresponding to the first target object from a first preset object model;

determining an abnormal data volume from the first target sub-model based on a preset model parameter, and determining a first detection result corresponding to the online operation behavior information based on a comparison result between the target data volume and the abnormal data volume;

obtaining a second target sub-model corresponding to the second target object and having a highest similarity with the first target sub-model from a second preset object model;

obtaining a target maximum data volume corresponding to the second target sub-model, and determining a second detection result corresponding to the online operation behavior information based on a comparison result between the target data volume and the target maximum data volume; and determining a target detection result of the online operation behavior information in accordance with the first detection result and the second detection result, further including:

when the first detection result is that the online operation behavior information is abnormal with respect to the first target object and the second detection result is that the online operation behavior information is abnormal with respect to the second target object, determining the target detection result comprising that the online operation behavior information is abnormal;

when the first detection result is that the online operation behavior information is normal with respect to the first target object and the second detection result is that the online operation behavior information is normal with respect to the second target object, determining the target detection result comprising that the online operation behavior information is normal;

when the first detection result is that the online operation behavior information is abnormal with respect to the first target object and the second detection result is that the online operation behavior information is normal with respect to the second target object, determining the target detection result comprising that the online operation behavior information is suspected abnormal; and when the first detection result is that the online operation behavior information is normal with respect to the first target object and the second detection result is that the online operation behavior information is abnormal with respect to the second target object, determining the target detection result comprising that the online operation behavior information is suspected abnormal.

18. The non-transitory computer-readable storage medium according to claim 17, wherein the first preset object model and the second preset object model are generated by:

obtaining a behavior information sample;

aggregating the behavior information sample according to a first preset object type to obtain a data volume set corresponding to each first object, constructing a first sub-model corresponding to the first object according to the data volume set, and determining each constructed first sub-model corresponding to the first object as the first preset object model;

aggregating the behavior information sample according to a second preset object type, to obtain a first object set and a maximum data volume corresponding to each second object;

traversing the first object set, and constructing at least one second object sub-model based on the first sub-model corresponding to the traversed first object; and combining the at least one second object sub-model and the maximum data volume into a second sub-model corresponding to the second object, and determining each combined second sub-model corresponding to the second object as the second preset object model.

19. The non-transitory computer-readable storage medium according to claim 17, wherein the obtaining a second target sub-model corresponding to the second target object and having a highest similarity with the first target sub-model from a second preset object model comprises:

obtaining at least one target second object sub-model corresponding to the second target object from the second preset object model;

obtaining at least one target similarity between the first target sub-model and the at least one target second object sub-model;

obtaining a highest target similarity from the at least one target similarity; and determining a target second object sub-model corresponding to the highest target similarity in the at least one target second object sub-model as the second target sub-model.

* * * * *